United States Patent [19]

Masui et al.

[11] Patent Number: 5,179,632
[45] Date of Patent: Jan. 12, 1993

[54] FAST METHOD FOR A BIDIRECTIONAL INFERENCE

[75] Inventors: Shoichi Masui, Kawasaki; Seiji Sakaguchi, Yokohama; Noriko Sasaki, Tokyo, all of Japan

[73] Assignee: Hitachi, Ltd., Tokyo, Japan

[21] Appl. No.: 283,179

[22] Filed: Dec. 12, 1988

[30] Foreign Application Priority Data

Dec. 17, 1987 [JP] Japan ................. 62-320853

[51] Int. Cl.$^5$ ............................................. G06F 15/18
[52] U.S. Cl. ....................................... 395/52; 395/51; 395/64
[58] Field of Search ................. 364/513; 395/52, 64

[56] References Cited

U.S. PATENT DOCUMENTS

| 4,649,515 | 3/1987 | Thompson et al. | 364/900 |
|---|---|---|---|
| 4,849,905 | 7/1989 | Loeb et al. | 364/513 |
| 4,866,635 | 9/1989 | Kahn et al. | 364/513 |
| 4,903,215 | 2/1990 | Masuishi et al. | 364/513 |
| 4,951,225 | 8/1990 | Lee et al. | 364/513 |
| 4,956,791 | 9/1990 | Lee et al. | 364/513 |

FOREIGN PATENT DOCUMENTS

| 60-134349 | 7/1985 | Japan . |
|---|---|---|
| 62-38934 | 2/1987 | Japan . |
| 63-76018 | 4/1988 | Japan . |

OTHER PUBLICATIONS

Forgy, Charles L., "Rete: A Fast Algorithm for the Many Pattern/Many Object Pattern Match Problem", Artificial Intelligence 19, (1982), pp. 17-37.
Barr, A, Feigenbaum, E., The Handbook of Artificial Intelligence, vol. I, 1981, pp. 23-26.
Johnson, L., Expert Systems Technology: a guide, Abacus Press, 1985, pp. 43-61.
Garner and Tsui, "General Purpose Inference Engine for Canonical Graph Models", Knowledge-Based Systems vol. 1(5), Dec. 1988, pp. 266-278.
Barr et al., The Handbook of Artificial Intelligence vol. II, Addison-Wesley Pub., 1982, pp. 155-162.
Eichhorn, W. and Niemann, H. "A Bidirectional Control Strategy in a Hierarchical Knowledge Structure, " Eighth International Conference on Pattern Recognition, Paris, France, Oct. 27, 1986, pp. 181-183.
Kaiser, Gail E., et al. "Database Support for Knowledge-Based Engineering Environments," IEEE Expert, vol. 3, No. 2, New York, Jul. 1988, pp. 18-32.
Becker, Lee A., et al. "Network Processing Hierarchical Knowledge for Classification and Diagnosis," IEEE First International Conference on Neural Networks, vol. 2, San Diego, Jun. 1987, pp. 309-317.
Christensen, Larry, et al., "CODAR: An Expert System Design Tool for Engineering Diagnostics," The Second International Conference on Computers and Applications, Peking, Jun. 23, 1987, pp. 650-655.

*Primary Examiner*—Michael R. Fleming
*Assistant Examiner*—Robert W. Downs
*Attorney, Agent, or Firm*—Fay, Sharpe, Beall, Fagan, Minnich & McKee

[57] ABSTRACT

In an inference method using a rule, a rule condition part network and rule consequence part network are generated, an integral network of both the networks is used for inference. With this information method, the inference is performed at high speed by setting a shortcut arc so as to process the inference along the pattern matchable network portion. Further, use of the integral network of the rule condition and consequence parts enables not only forward and backward inferences but also a bidirectional inference with intimate couple between forward and backward inferences.

17 Claims, 18 Drawing Sheets

FIG. 2

```
<RULE> ::= <RULE NAME> IF <LHS PATTERN> THEN <RHS PATTERN>

<LHS PATTERN> ::= <WME PATTERN>---

<RHS PATTERN> ::= <WME PATTERN>

<WME PATTERN> ::= (<CLASS NAME> ((<SLOT NAME>(<VALUE>|<VARIABLE>))---)

<CLASS NAME> ::= <CHARACTER STRING>

<SLOT NAME> ::= $ <CHARACTER STRING>

<VALUE> ::= <CHARACTER STRING>

<VARIABLE> ::= ?<CHARACTER STRING>

<WME> ::= (<CLASS NAME>(<SLOT NAME><VALUE>)--- )

<GOAL> ::= <WME>
```

FIG. 3

```
(PUMP $ SYSTEM A SYSTEM $ REV. SPEED HIGH $ ALTERNATIVE MACHINE PUMP NO. 3 )   ~31
(TURBINE $ SYSTEM A SYSTEM $ STATUS NORMAL $ ALTERNATIVE MACHINE TURBINE NO. 4 )   ~32

LULE 1  IF   (PUMP $ SYSTEM A SYSTEM $ REV. SPEED HIGH $ ALTERNATIVE MACHINE ? X )
                                                                    ~33
             (TURBINE $ SYSTEM A SYSTEM $ SYSTEM NORMAL )
       THEN  (CHECK RESULT $ FAULT POSITION A SYSTEM $ START MACHINE ? X )
                                                                    ~34
(CHECK RESULT $ FAULT POSITION A SYSTEM $ START MACHINE PUMP NO. 3 )
```

FIG. 4

```
         FORWARD-ROOT NODE
                |                    ⎤
                |                    |  LHS
   CONSTANT NODE, VARIABLE NODE      |  NET
                |                    ⎦
                |
          TERMINAL NODE
                |
                |                    ⎤
   CONSTANT NODE, VARIABLE NODE      |  RHS
                |                    |  NET
                |                    ⎦
         BACKWARD-ROOT NODE
```

FIG. 5

| RULE A | IF   | (A  $A1  a1  $A2  a2  $A3  ?X) |
|--------|------|---------------------------------|
|        | THEN | (C  $C1  c1  $C2  c2  $C3  ?X) |

| RULE B | IF   | (A  $A1  a1  $A2  a2  $A3  a3) |
|        |      | (B  $B1  b1  $B2  b2  $B3  b3) |
|        | THEN | (C  $C1  c1  $C2  c2  $C3  c3) |

| RULE C | IF   | (B  $B1  b1  $B2  b2  $B3  b3) |
|        |      | (C  $C1  c1  $C2  c2  $C3  ?Y) |
|        | THEN | (D  $D1  d1  $D2  d2  $D3  ?Y) |

| RULE D | IF   | (D  $D1  d1  $D2  d2  $D3  d3) |
|        | THEN | (E  $E1  e1  $E2  e2  $E3  e3) |

1

FAST METHOD FOR A BIDIRECTIONAL INFERENCE

BACKGROUND OF THE INVENTION

The present invention relates to a method of processing forward, backward and bidirectional inferences at high speed using rules.

A known method of determining whether conditions are satisfied or not uses a network of rule condition parts analogous to a discrimination network. Such method is described in "Rete: A Fast Algorithm for the Many Pattern/Many Object Pattern Match Problem", Artificial Intelligence, vol. 19, No. 1, 1982, incorporated herein by reference.

According to the above method, satisfied conditions are determined whether they are satisfied or not by using a network into which conditions have been transformed, the conditions being the structural data composed of the names of so-called current data and one or a plurality of pairs of attribute names and attribute values.

The conditions of current data are constructed of a plurality of condition clauses representative of current data attributes, the condition clauses corresponding to nodes of the network. The following procedure is carried out to determine whether the conditions are satisfied or not: The current data are supplied to the network to check if the data satisfy the condition clauses stored in each node. If satisfied, the data are supplied to the next node, whereas if not, the process is terminated. The above processes are repeated. If the process reaches the terminal node, it is judged that the condition indicated by the condition name (rule name) described in the terminal node has been satisfied. This method is advantageous in its fast processing.

The above-described method concerns a fast algorithm for forward inference and not for bidirectional inference. There is known a bidirectional inference oriented method.

For example, consider a backward inference rule "G←A, B" representative of that event names A and B are checked to instantiate G. The backward inference is initiated by transforming the rule into "If G', A, B, Then G" and writing G' in the working memory. In other words, the characteristic feature of such backward inference is that only the rule contributable to judgement of a satisfied goal is used. That such a rule is to be used now is represented by G' like a flag which is added to the rule condition part, so that the rule can be used only when it is required, i.e., the rule can be used as if backward inference is initiated.

According to the above method, when a backward inference rule is transformed into a corresponding forward inference rule which is usable only when the associated goal is guided, a condition instructing such guidance is added to the condition part of the rule to determine whether the added condition is satisfied and thus initiate backward inference.

The problems associated with the above-described conventional backward inference method will be described with respect to its function and performance.

First, the problems associated with the function will be described. It is necessary for the inference processing of the conventional method to completely grasp the events used in the backward inference. Therefore, the events should be definitely discriminated between the forward and backward inferences.

This means that forward and backward rules should be written in clear and distinguishable designations. However, a rule "If A, B, then G" merely and literally states that "if A and B are satisfied, G can be obtained" so that the rule may be used both in forward and backward inferences. In other words, the use of the rule depends on the inference circumstance so that it may be used in forward inference or in backward inference depending on the circumstance at that time. Bidirectional inference by the above method is difficult to be realized.

The problems associated with the performance will next be described. It is necessary for the inference processing of the conventional method to completely grasp the events used in the backward inference and always monitor the events if they are to be checked. Namely, in the above example, assuming that the event A is not still determined whether it is satisfied or not during execution of the rule, it becomes necessary to judge if the event A is related to the backward inference, and if so, A' should be written in the working memory. Such judgement is necessary for all the condition part attributes. The above method is therefore fast for forward inference but slow for backward inference. Since pseudo backward inference is carried out using forward inference, the above judgement becomes necessary, which results in an overhead of the inference processing.

As a result, there remain the problems associated with the function and performance of the conventional bidirectional inference method realizing bidirectional inference using a fast forward inference method.

SUMMARY OF THE INVENTION

It is an object of the present invention to provide a method of performing at high speed not only forward inference but also backward inference and bidirectional inference with intimate couple between the forward and backward inferences.

It is another object of the present invention to provide a method of forming at high speed a rule relation graph, necessary for use in bidirectional inference, composed of a condition part network, consequence part network, and shortcut arcs.

The above objects can be achieved in the following manner.

First, fast processing of bidirectional inference is carried out in accordance with the following procedure:

(1) Each condition constituting a rule condition part in a knowledge base is represented by a node, and a relation among respective conditions is represented by an arc, to thereby obtain a network representative of the rule condition part analogous to a discrimination network with a root node.

(2) Similarly, each statement constituting a rule consequence part in the knowledge base is represented by a node, and a relation among respective statements is represented by an arc, to thereby obtain a network representative of the rule consequence part analogous to a discrimination network with a root node.

(3) The networks representative of the rule condition and consequence parts are coupled together by terminal nodes to form an integrated network. The integrated network is also called herein a rule relation graph which has two root nodes representative of the rule condition and consequence parts, respectively.

(4) Inference is carried out in the following manner by using the resultant integrated network:

(a) In the forward inference, the status data of an object (also called a working memory element (WME), e.g., in the case of process control, temperature, pressure and the like at various points in the process control system) are supplied to the network from the forward-root node of the rule condition part toward the backward-root node of the rule consequence part. The nodes satisfying the conditions are sequentially traced, and the status data are eventually supplied to the consequence part network to obtain the result.

(b) In the backward inference, contrary to the forward inference, a goal to be instantiated is supplied from the backward-root node toward the upper forward-root node to identify a rule for the goal and further obtain a new sub-goal at the rule condition part network.

According to the present invention, the single integrated network constructed as above enables to realize both forward and backward inferences. In particular, current status data are supplied to the network from the forward-root node at the top of the condition part network for realizing forward inference, whereas a goal is supplied to the network from the backward-root node at the top of the consequence part network for realizing backward inference. Bidirectional inference using the same rule can also be realized.

In other words, in the network constructed such that the network representative of the rule condition part is situated above and the network representative of the rule consequence part is situated below, the highest node is the forward-root node and the lowest node is the backward-root node. In such a network, the process flow from the upper forward-root node toward the lower backward-root node represents forward inference, whereas on the other hand the process from the lower backward-root node toward the upper forward-root node represents backward inference.

An attribute regarding the direction of information flow on an arc of the network is provided so that unnecessary information flow within the network can be eliminated, to thus speed up inference.

Further, a shortcut arc to be described later is provided for direct couple between the consequence and condition part networks to pass a same condition if such a condition appears in the networks. The new result obtained through forward inference can be supplied therefore to the network not from the forward-root node, but from the midway of the condition part network by following the shortcut arc, thus speeding up the forward inference. In the case of backward inference, an obtained sub-goal is supplied to the network not from the backward-root node but from the midway of the network by following the shortcut arc, thus speeding up the backward inference.

Furthermore, the status data and a goal flowing within the network are controlled so that a forward inference can be realized with various conflict resolution tactics. With the control of a goal, many types of inferences including a backward inference can be realized with various tactics such as breadth first search, depth first search and the like. Unnecessary network processing can be avoided by storing history information regarding a goal in the network.

According to the present invention, in order to form a rule relation graph, the condition and consequence part networks are generated and in addition, a shortcut arc coupling them is set within the network.

The condition and consequence part networks are of a discrimination network so that the pattern of the condition part can be determined if it is satisfied or not with small number of conditions, thus resulting in efficient judgement. Such efficiency is allowed by collectively using same conditions. A shortcut arc should be set based on the preliminary analysis in such a manner that data are supplied only to those nodes in which pattern match can be obtained.

Since the shortcut arc couples the condition and consequence part networks together, whether an efficient shortcut arc is realized or not depends on the structure of the condition and consequence part networks. In other words, efficient consequence and condition part networks alone do not necessarily result in an efficient shortcut arc. Therefore, the condition and consequence part networks, and shortcut arc should be generated from the integral standpoint of view.

In addition, in setting a shortcut arc, it is necessary to check the matching between patterns. However, this check is required for all the combinations of condition and consequence part patterns, thus resulting in a bulky processing amount.

As above, basically, the rule condition and consequence parts should be analyzed from the integral standpoint of view. It is also difficult to form a rule relation graph, and a processing amount becomes large.

In view of the above, the relation among patterns should be analyzed in order to generate efficient condition and consequence part networks and shortcut arcs. For instance, data generated by a consequence part pattern should be analyzed as to if the data satisfy a condition part pattern, do not satisfy it, or have a possibility of satisfying it.

A pattern defines the status of an object (e.g., in a production system, the status of a working memory), and describes the condition to be satisfied by the object.

According to the present invention, a hierarchical graph of patterns is formed using an inclusion relation among patterns. The hierarchical graph is added with other relations so that the rule relation graph can be formed simply by partially obtaining the relation among patterns.

Further, same conditions are collectively expressed in a single node so that efficient condition and consequence part networks are possible.

Furthermore, a shortcut arc can be set such that information (status of an object, a goal to be instantiated) is supplied only to the network portion where condition matching process is required.

Still further, the rule relation graph can be formed such that unnecessary information flow is avoided.

With the above manner, an efficient rule relation graph can be formed.

BRIEF DESCRIPTION OF THE DRAWINGS

FIG. 2 illustrates a syntax of knowledge representation in the embodiment system of this invention;

FIG. 3 illustrates statement examples by the designation of the embodiment system;

FIG. 4 illustrates the hierarchy of nodes;

FIG. 5 illustrates rule statement examples;

DESCRIPTION OF THE PREFERRED EMBODIMENTS

The embodiments of the present invention will be described with reference to the accompanying drawings.

Figure 1:
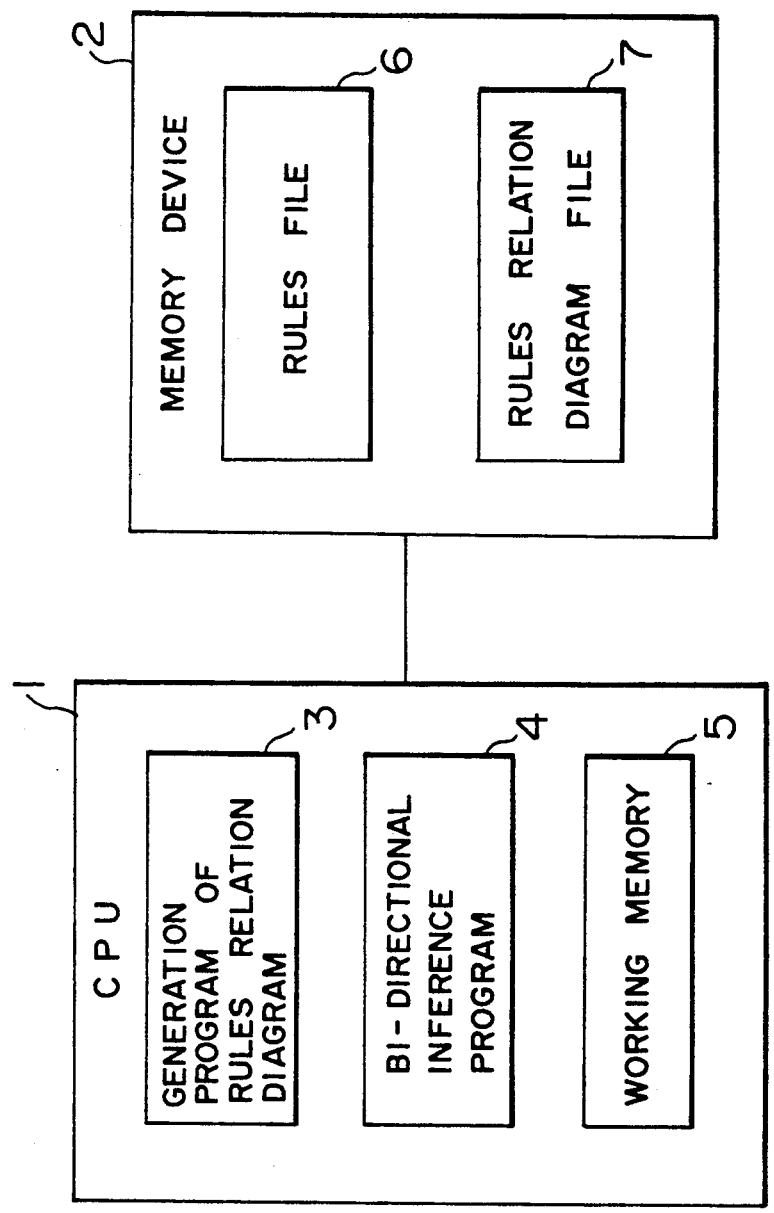
FIG. 1 is a block diagram showing the system arrangement of an embodiment of this invention.

FIG. 1 shows the outline of the system arrangement of this invention. The system is constructed of a CPU 1 and a memory device 2 as its hardware. The present invention can be realized using a common computer system including an input/output device not shown.

CPU 1 executes a program 3 for generating a rule relation diagram and a bidirectional inference program 4. A working memory 5 described later is provided within a main memory of CPU 1.

The memory device 2 is provided with a rules file 6 and a rules relation diagram file 7. The syntax of knowledge statements used in the present inference method is illustrated in FIG. 2, and the examples of statements are shown in FIG. 3.

A working memory element (WME) stored in the working memory 5 represents the status of an object, which element is composed of, as shown in FIG. 2, a class name and a plurality of pairs of slot names and slot values. For example, a WME 31 shown in FIG. 3 has a class name of "pump", and slot names of "system", "resolution speed", and "alternate pump" respectively having the values of "A series", "high" and "pump No. 3".

A rule is constructed of a condition part including statements of WME status, and a consequence part including WME statements generated based on the satisfied condition part. A single condition in the WME is called a condition clause. The condition part is constructed of a plurality of condition clauses. The consequence part is constructed of a single WME statement. A rule 1 shown in FIG. 3 indicates that if an A system pump with high revolution speed is used, and the same A system turbine is normal, then an associated WME statement is generated.

"?X" represents a variable which takes a same number within a single rule. If rule 1 matches WME 31 and WME 32, then the statement WME 34 of (check result $ failure position A system $ start machine pump No. 3) is generated.

The inference method includes fundamental forward inference and backward inference. The method also includes inference (called "backward reverse type cooperation inference") wherein if an WME necessary for forward inference is not known, such unknown condition is confirmed automatically through backward inference, and inference (called "backward restart cooperation inference") wherein if data necessary for a backward inference previously failed are collected, the backward inference is restarted. Thus, the method includes four types of inferences in total.

A goal supplied for a backward inference is similar to WME, an example of which is shown as a goal 34. The bidirectional inference program 4 guides the goal. Thus, inference progresses aiming at writing the goal in the working memory 5.

In the present inference method, a rule is transformed into a network with which inference is carried out.

In the following, first, network representation of a rule will be described, next how a network is generated using a rule will be described, and finally a bidirectional inference execution algorithm using the network will be described.

1. Rule Network Representation

A network representative of a rule condition part is called an LHS net, and a network representative of the rule consequence part is called, an RHS net (refer to FIG. 4).

An LHS net is represented by three types of nodes, i.e., a forward-root node at the top of the LHS net, a constant node for comparison with a constant, and a variable node for comparison with a variable. Similarly, an RHS net is represented three types of nodes, i.e., a backward-root node at the top of the RHS net, a constant node for insertion of a constant, and a variable node for insertion of each item value of WME matching the condition part.

The networks are coupled by terminal nodes, the resultant network has a node hierarchy as shown in FIG. 4.

In the hierarchy shown in FIG. 4, it is assumed that a process from the upper to the lower (i.e., forward inference) is standard, an arc above a node is an input arc, and a node below the node is an output node. The forward-root node has a plurality of output arcs. A constant node and variable node each has one input arc and one output arc. A terminal node has a plurality of input arcs and one output arc. The backward-root node has a plurality of input arcs.

WMEs passed to the input and output arcs of a terminal node of the network are stored.

The terminal node has input arcs as many as the number of condition clauses of an LHS part. Each WME stored at the input arc is a WME satisfying each condition clause. At the output arc thereof, a set of WMEs from the input arcs are stored. This WME set represents an instantiation satisfying the rule condition part. Unsatisfied goals and sub-goals are stored at the output arc of the terminal node.

An example of a rule is shown in FIG. 5. An embodiment network with which all rules may be used bidirectionally is shown in FIG. 6.

Figure 6:
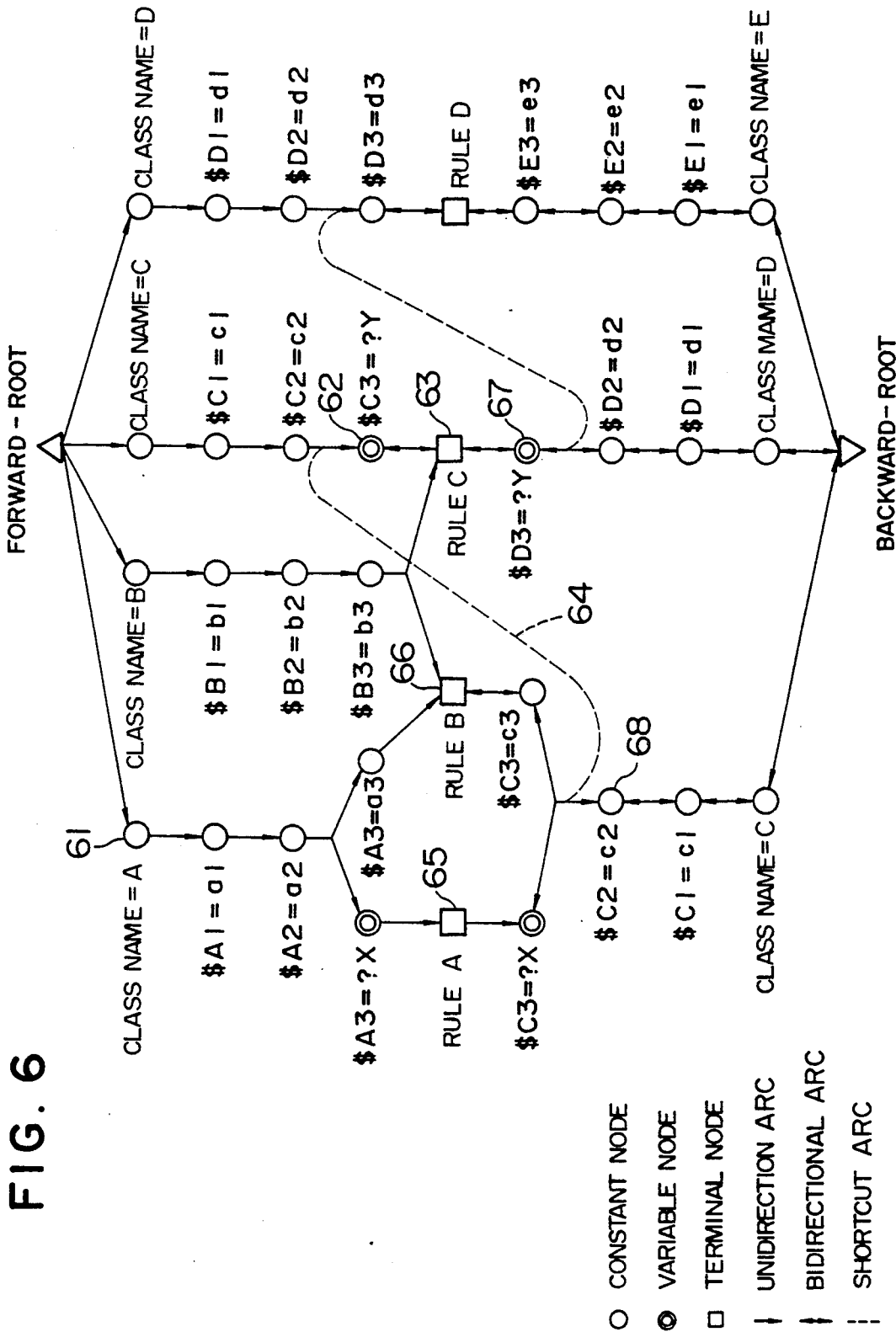
FIG. 6 is a rule relation graph for the rules shown in FIG. 5.

Referring to FIG. 6, a circle indicates a constant node, e.g., a node 61 has a class name of "A". A double circle indicates a variable node, e.g., at a node 62 the value of slot C is inserted into "?Y". A square indicates a terminal node, e.g., a node 63 is the terminal node of rule C.

Arcs constituting the network include a unidirectional arc and a bidirectional arc. For instance, in the LHS net for rules A and B, even if a sub-goal is generated, it cannot be used by other rules for instantiation so that a unidirectional arc is applied. An arc indicated by a broken line is a shortcut arc, e.g., an arc 64 is a shortcut arc for passing three common nodes including "class name=C", "$C1=c1", and "$C2=c2".

2. Method of Forming Rule Relation Graph

The relation among patterns should be analyzed in order to generate efficient condition and consequence part networks and shortcut arcs. For instance, data generated by a condition part pattern should be analyzed as to if the data satisfy a condition part pattern, do not satisfy it, or have a possibility of satisfying it.

A pattern defines the status of an object (the status represented by a working memory element WME), and describes the condition to be satisfied by the object. The set of all the statuses is represented here by T, and the set of statuses satisfying patterns Pa and Pb are represented here by Sa and Sb, respectively. The implications of patterns Pa and Pb can be expressed by the sets Sa and Sb of statuses satisfying the respective patterns. Sa and Sb can be defined as:

$$Sa = \{x | x \epsilon T, x \text{ satisfies } Pa\}$$

$$Sb = \{x | x \epsilon T, x \text{ satisfies } Pb\}$$

In the following, it is assumed that Sa and Sb are not 0. Namely, there is included no pattern which is not satisfied. Patterns Pa and Pb are classified into four types, i.e.:

for the case without relation: $Sa \cap Sb = 0$
for the case with relation: $Sa \cap Sb \neq 0$, $Sa \cap Sb \neq Sa$, $Sa \cap Sb \neq Sb$
for the case of inclusion: $Sa \supset Sb$ or $Sa \subset Sb$
for the case of equality: $Sa = Sb$ The relations between patterns can be defined accordingly as follows:

(1) Difference Relation (←D→)

if $Sa \cap Sb = 0$, a D relation is present between Pa and Pb, which is described as Pa←D→Pb.

(2) Matchable Relation (←M→)

If $Sa \cap Sb \neq 0$, $Sa \cap Sb \neq Sa$ and $Sa \cap Sb \neq Sb$, an M relation is present between Pa and Pb, which is described as Pa←M→Pb.

(3) Super-sub Relation (←S-, -S→)

If $Sa \supset Sb$ or $Sa \subset Sb$, an S relation is present between Pa and Pb. In case of $Sa \supset Sb$, the relation is described as Pa<S-Pb. In this case, Pa is called an upper (super) pattern relative to Pb, and Pb is called a lower (sub) pattern relative to Pa. In case of Sa Sb, it is described as Pb←S-Pa.

(4) Equal Relation (←E→)

If Sa=Sb, an E relation is present between Pa and Pb, which is described as Pa←E→Pb. Patterns with an E relation have the same meaning so that they are considered as one pattern collectively, and the M relation is not checked.

Upon analyzing the above relations, it is possible to obtain information based on which the number of pattern matching processes can be reduced, as in the following:

if Pa←E→Pb, the status satisfying Pa always satisfied Pb, and the status satisfying Pb always satisfies Pa;

if Pa←D→Pb, the status satisfying Pa does not satisfy Pb by all means, and the status satisfying Pb does not satisfy Pa by all means;

if Pa←S→Pb, the data satisfying Pa do not always satisfy Pb, however the data satisfying Pb always satisfy Pa; and if Pa←M→Pb, the data satisfying Pa do not always satisfy Pb, and the data satisfying Pb do not always satisfy Pa.

A pattern is expressed by a set of character string and numerical values (range on a numerical line). When a pattern includes a character string, a relationship between the pattern and another pattern can be classified into either Difference (D) relation or Equal (E) relation, depending upon whether the character string of the pattern coincides with that of another pattern. In the case of numerical values, a numerical set of a pattern is expressed by a set of inequalities designating a range. Thus, a relationship between two patterns can be easily determined by checking inclusive relations between the inequalities of the patterns. Namely, S relation where one completely includes the other; E relation where both patterns completely coincide with each other; D relation where one pattern is exclusive of the other; and, M relation where both patterns share at least a part of the pattern. In such a manner, the relationships between patterns can be easily found by comparing the respective patterns.

In order to obtain the above relations between patterns, all the combinations of patterns should be checked so that the process amount increases in proportion to the square of the number of patterns.

However, there are the following characteristic features in the four types of relations:

(a) the S relation is transitive;
(b) if Pa←M→Pb, and there is no S relation between Pc and Pa satisfying Pa←S→Pc, then Pa←M→Pc stands; and
(c) if Pa←D→Pb and Pa←S→Pc, then Pa←D→Pc stands. It is seen from the feature (a) that patterns can be expressed by a hierarchical graph using the S relation. Based on the feature (b), in the hierarchical graph of S relation, it is seen that if an M relation is present between Pa and Pb, the upper patterns are also related to the M relation so long as the S relation is not present therebetween. Thus, the M relation can be passed to the upper patterns in the hierarchical graph. Further, based on the feature (c), it is seen that if a D relation is present between Pa and Pb, the lower patterns are also related to the D relation. Thus, the D relation can be passed to the lower patterns in the hierarchical graph.

That is, by adding partially the D and M relations to the hierarchical graph of S relation by using the feature (a), it becomes possible to know the relation between patterns based on the features (b) and (c).

The hierarchical graph of S relation can be formed at high speed. Partial setting of the D and M relations is permitted if the features (b) and (c) are utilized.

In particular, formed first is a pattern hierarchical graph of S relation whose root is a virtual pattern satisfying all the statuses. In the case where there are a plurality of lower patterns directly coupled to a pattern and an M relation therebetween, an arc (called an M arc and indicated by a broken line) coupling the patterns is set. This graph is called an IM graph.

In the case where patterns Pa and Pb are directly coupled through the S relation, i.e., where an arc Pa←Pb is present, a node is generated at the arc for indication of a difference of conditions between patterns Pa and Pb, and terminal nodes are provided for all the patterns, thus forming a discrimination net for patterns present in the IM graph. Therefore, a discrimination net can be formed directly from the IM graph.

An upper pattern has conditions common to a lower pattern. Therefore, by forming a discrimination net directly from the IM graph starting from the upper pattern toward the lower pattern, an efficient discrimination network can be obtained.

Further, by expressing the condition and consequence part patterns in a single IM graph, the following information can be obtained based on which shortcut arcs can be set.

If pattern Px has been matched upon execution of a rule, it means that the upper patterns relative to Px are always satisfied, whereas the lower patterns can be checked if they are satisfied or not only by checking the difference between lower patterns and Px. Namely, the upper patterns relative to Px are those patterns which can be determined matchable with Px without performing a pattern matching process, and can be directly coupled via a shortcut arc. The lower patterns are those patterns whose matching can be checked after the partial pattern matching process, and which can be coupled to the network portion having necessary pattern matching conditions via a shortcut arc.

In addition, those patterns which are coupled by the M arc to Px and its upper patterns have a possibility of matching. Therefore, similar to the lower patterns relative to Px, they are coupled to the network portion having necessary pattern matching conditions via a shortcut arc. On the other hand, those patterns which are not coupled by the M arc to Px and its upper patterns are not satisfied so that it becomes clear that they are not necessary to be coupled to Px by a shortcut arc.

As above, the rule relation graph according to this invention can be formed by the following procedure:

Step 1: A graph representing a hierarchy among patterns is generated using the inclusion relations among condition part patterns and consequence part patterns. An arc is set which is representative of the matchable relation between patterns which are related to the same upper pattern.

Step 2: The patterns constituting the condition part and the arcs representative of the inclusion relation are picked up from the obtained graph, and the difference between conditions of patterns coupled by an arc is expressed as a node at the arc, to thus form a condition part network.

Step 3: The patterns constituting the consequence part and the arcs representative of the inclusion relation are picked up from the obtained graph, and the difference between conditions of patterns coupled by an arc is expressed by a node at the arc, to thus form a consequence network.

Step 4: A shortcut arc is set for coupling the arcs to the terminal node representative of matching of each pattern in the condition part network and the consequence part network, to the arcs to the nodes based on which the lower patterns are checked as to their matching, in case where the both types of the arcs are present over the condition and consequence part networks, or for coupling together the arcs to the patterns coupled by a matchable arc, in case where the arcs are present over both the networks.

The rule relation graph is formed in accordance with the above procedure. Then, a unidirectional arc is set by the following procedure for indication of the flow of information within the rule relation graph, the information including the statuses of an object, and goals to be instantiated.

Step 5: An attribute for inhibiting a data flow to the root node is set in the rule relation graph for those arcs starting from the root node of the condition part network to the first occurrence shortcut arc.

Step 6: An attribute for inhibiting a data flow to the root node is set in the rule relation graph for those arcs starting from the root node of the consequence part network to the first occurrence shortcut arc.

Step 7: If a plurality of arcs are joined together, an attribute for inhibiting the data flow to the junction is set in the rule relation graph for the arcs except one arc.

The rule relation graph generating algorithm using the above procedures will be described.

Generating the rule relation graph includes two steps: (1) generating a hierarchical graph whose structural elements are LHS and RHS patterns, and (2) generating in the obtained hierarchical graph the LHS network, RHS network and shortcut arcs.

Figure 7:
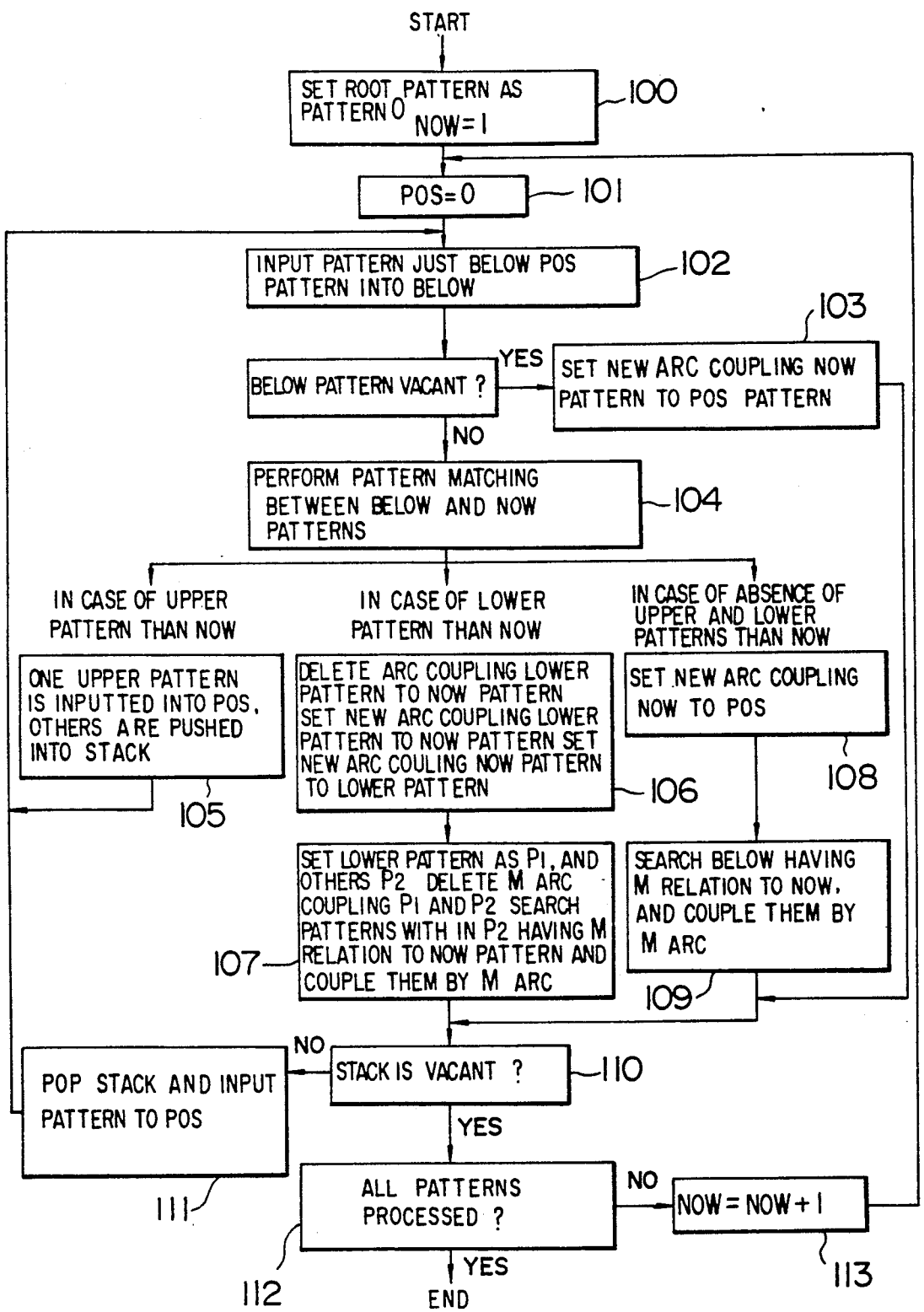
FIG. 7 is a flow chart for forming a graph showing the relation among patterns.

The flow chart of generating the hierarchical graph is shown in FIG. 7. Patterns expressed in the hierarchical graph is given serial numbers (1, 2, 3 . . . ). As a virtual uppermost pattern among all the patterns, a root pattern which is a non-restricted pattern established for all cases is provided. The root pattern is given as number 0. The pattern 0 is the top of the hierarchical graph. The patterns are sequentially analyzed starting from pattern 1 to generate the hierarchical graph. A pattern newly registered in the hierarchical graph is given a number NOW, and a pattern now analyzed in the hierarchical graph is given a name POS. It is assumed that "patterns just below a certain pattern" mean the lower patterns directly coupled to that pattern, and that contrary to the above, "patterns just above a certain pattern" mean the upper patterns directly coupled to that pattern.

At initialization steps, the root pattern is set as pattern 0, NOW=1 and POS=0 (steps 100 and 101). This is effected to compare a pattern immediately below the root pattern with pattern 1 which is currently to be compared. Next, the patterns just below POS (the root pattern immediately after initialization) are inputted to BELOW (step 102).

Figure 8:
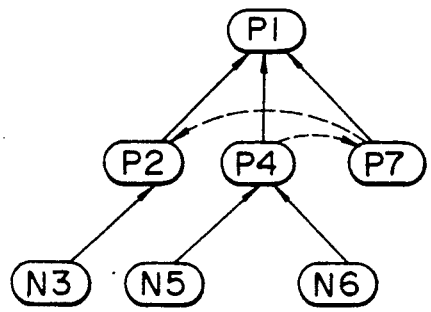
FIGS. 8 to 11 are graphs showing a relation among patterns.
Figure 9:
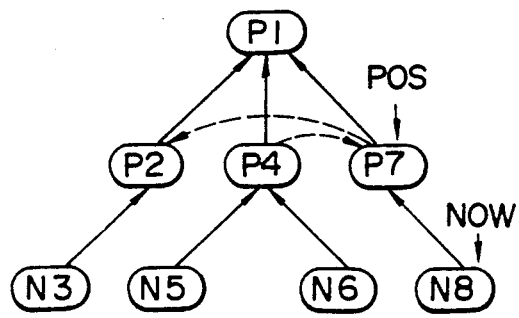

Immediately after the initialization, BELOW is vacant since there are no patterns just below the root pattern. As an example of BELOW, "2, 4 and 7" are entered in BELOW in case of POS=1 in the graph of FIG. 8. If BELOW is vacant, POS pattern corresponds to a leaf of the graph. Therefore, there is nothing to be compared with pattern of NOW. Accordingly, NOW pattern can be regarded as the pattern lower than POS unconditionally. For example, if new pattern 8 (NOW=8) is added to the graph in FIG. 8, POS=7 is attained and BELOW becomes vacant in case where the new pattern 8 can be located at a position lower than pattern 7. Thus, the pattern 8 can be added immediately below pattern 7, and the graph of FIG. 9 is obtained. A solid line in FIG. 9 represents an S arc, and a broken line represents an M arc.

If BELOW is not vacant, pattern matching is performed between BELOW and NOW patterns (step 104).

(1) Where BELOW patterns include patterns to be situated upper than NOW pattern:

One pattern from those patterns to be situated upper than NOW pattern is selected and inputted to POS, the remaining patterns are pushed in STACK, in case where NOW pattern is successively compared with patterns in BELOW and at least one pattern upper than it is present (step 105). For example, in FIG. 8, if patterns 2 and 4 among patterns 2, 4 and 7 are to be situated upper than NOW pattern in comparison with NOW pattern, and if it is set as POS=2 for example, then pattern 4 is pushed in STACK.

Figure 10:
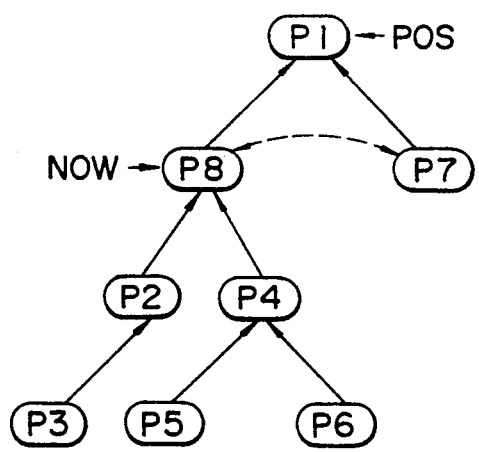

(2) Where BELOW patterns include patterns to be situated lower than NOW pattern:

Arcs which couple patterns to be situated lower to POS pattern are deleted. The patterns are coupled to NOW pattern which is then coupled to POS pattern (step 106). For example, if patterns 2 and 4 among patterns 2, 4 and 7 are to be situated lower than NOW pattern, the connection among patterns becomes as shown in FIG. 10. In this case, M arcs become necessary to be updated. It is assumed here that patterns to be situated lower are designated by patterns P1 and those upper by patterns P2. M arcs which couple patterns in patterns P1 and P2 are deleted, and patterns in patterns P2 having M relation with NOW pattern are coupled to NOW pattern via M arcs (step 107). For example, if M arcs are used between patterns 2 and 4, and between patterns 4 and 7, then the M arc between patterns 4 and 7 is deleted, whereas if M relation is present between patterns 8 and 7, then an M arc between the patterns 8 and 7 is generated.

Figure 11:
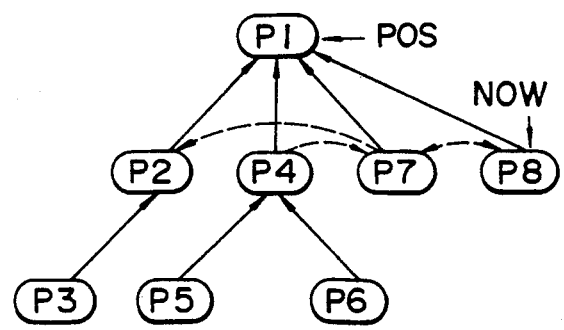

(3) Where BELOW patterns do not include patterns to be situated lower or upper than NOW pattern:

NOW and POS patterns are coupled (step 108). For example, if patterns 2, 4 and 7 are neither situated lower nor upper than NOW pattern, then the connection of the graph becomes as shown in FIG. 11. In this case, M arcs become necessary to be updated. BELOW patterns having an M relation to NOW pattern are coupled by M arcs (step 109).

The above processes are repeated until STACK becomes vacant (steps 110 and 111). If STACK becomes vacant (step 112), NOW is incremented (step 113) to add the next pattern to the hierarchical graph. The above processes are carried out for all patterns.

Figure 12:
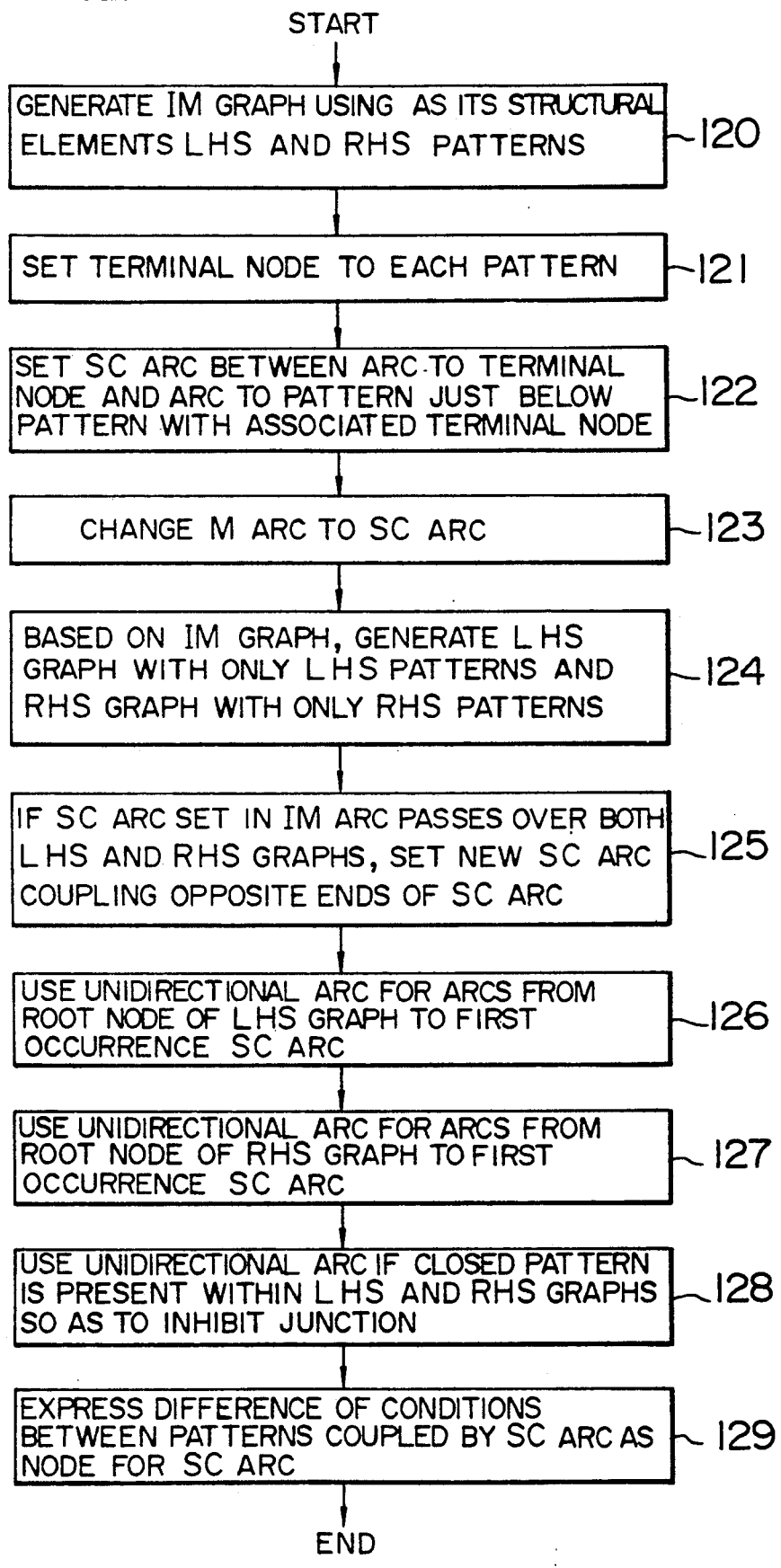
FIG. 12 is a flow chart for forming a rule relation graph using the pattern relation graph.

The hierarchical graph is thus generated. Next, the rule relation graph is generated from the hierarchical graph. The rule relation graph generating algorithm is shown in FIG. 12.

Figure 13:
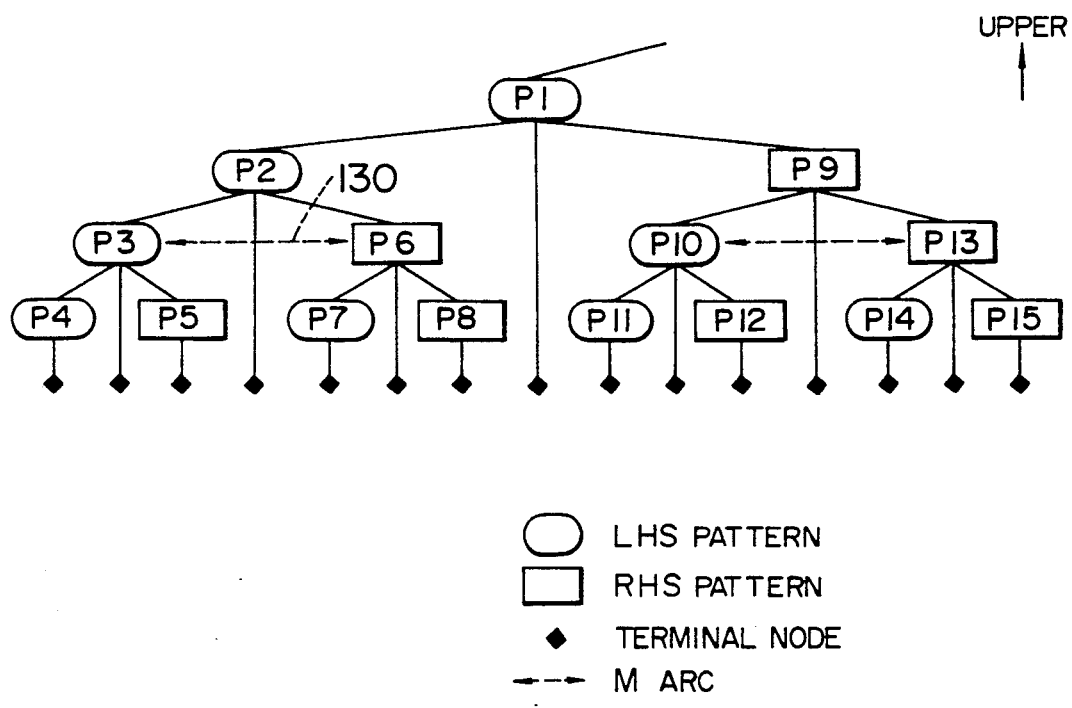
FIG. 13 shows an example of the hierarchical graph with terminal nodes added to respective patterns.

First, using the obtained LHS and RHS patterns as the structural elements, the hierarchical graph is generated (step 120). Each pattern in the graph is assigned a terminal node (step 121). An example of the obtained graph is shown in FIG. 13. In this hierarchical graph, an LHS pattern is surrounded by a rectangular with curved sides, an RHS pattern is surrounded by a rectangular, and a terminal node indicating satisfied pattern is represented by a solid arrow. A broken line indicates an M arc.

Figure 14:
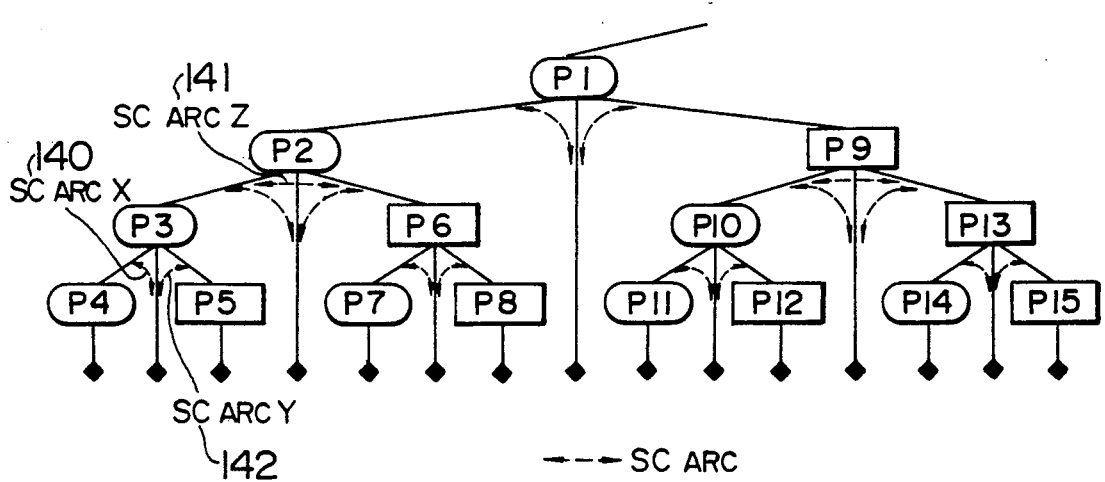
FIG. 14 shows an example of the hierarchical graph with shortcut arcs.

A shortcut (SC) arc is first set in the hierarchical graph for shortcutting necessary patterns (steps 122 and 123). SC arcs include:

(1) arcs for coupling the arcs to a terminal node to the arcs to patterns just below the terminal node; and (2) arcs for coupling the arcs to patterns coupled by an M arc. The hierarchical graph shown in FIG. 13 is provided with SC arcs as shown in FIG. 14. For example, SC arc X 140 couples an arc to terminal node for P3 to an arc to pattern P4 just below P3, SC arc X 140 belonging to the type (1) arc. SC arc Z 141 couples arcs to P3 and P4 coupled by the M arc shown in FIG. 13, SC arc Z 141 belonging to the type (2) arc.

Figure 15:
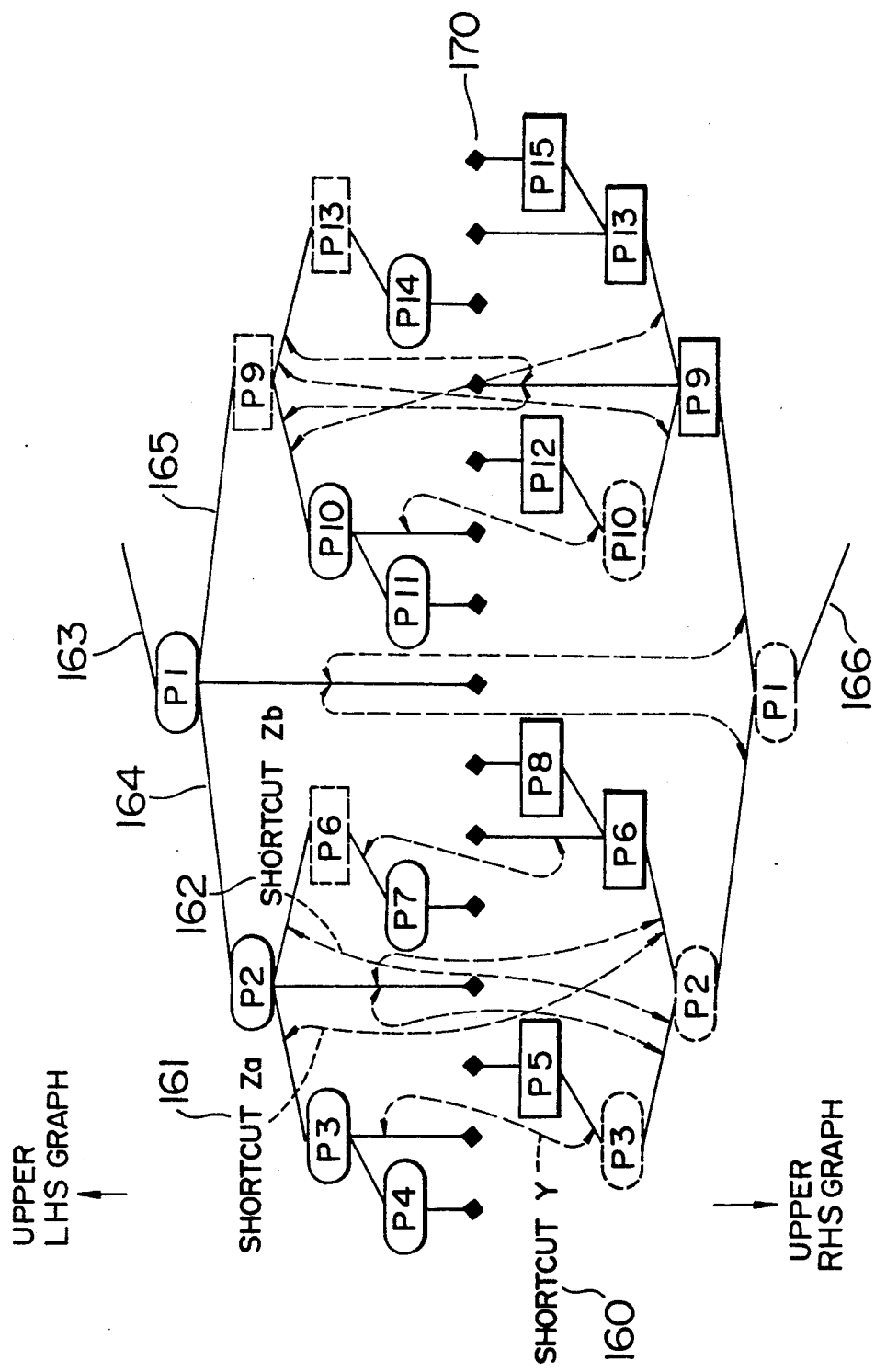
FIG. 15 shows an example of a graph with LHS graph and RHS graph.

Next, the graph is divided into two parts for generating the LHS and RHS nets, in order to generate the LHS net, a hierarchical graph including only LHS patterns becomes necessary. To this end, nodes are deleted starting from a leaf of the hierarchical graph until a node representative of an LHS pattern appears. Namely, the portion where nodes representative of an RHS pattern are consecutively coupled to the leaf node, is deleted and hence terminal nodes and their arcs are deleted. This graph is called an LHS graph. An RHS graph is generated in a similar manner (step 124). In FIG. 15, the portion upper than terminal nodes 170 corresponds to the LHS graph, and the lower portion corresponds to the RHS graph.

Next, SC arcs are set, if opposite ends of an SC arc set in the hierarchical graph are located respectively in the LHS and RHS graphs, i.e., if they pass over both the graphs, the SC arc set in FIG. 14 is definitely set again in FIG. 15 (step 125). With this step, shortcut arcs indicated by a broken line in FIG. 15 can be set. For example, the opposite ends of SC arc X 140 shown in FIG. 14, i.e., the arc to the terminal node for P3 and the arc to pattern P4 just below P3, are both within the LHS graph so that the SC arc X 140 is not set as a shortcut arc. However, the opposite ends of SC arc Y 142, i.e., the arc to the terminal node for P3 and the arc to pattern P5 just below P3, are respectively within the LHS and RHS graphs so that it is set as SC arc Y 160 in FIG. 15. Since the SC arc Z 141 has its opposite ends the arcs to P3 and P6 which are within both the LHS and RHS graphs, the SC arc Z 141 is set as two SC arcs Za 161 coupling the arc to P3 within the LHS graph to the arc to P6 within the RHS graph, and is set as an SC arc Zb 162 coupling the arc to P6 within the LHS graph to the arc to P3 within the RHS graph.

Next, an attribute regarding the direction of information (WME and goal) on an arc is set.

Arcs from the root node of the LHS graph to the first occurrence SC arc use unidirectional arcs which inhibit the information flow to the root node (step 126). For example, in the LHS graph shown in FIG. 15, if an SC arc is not present at upper arcs than P1, the information flow from P2 to P1, and from P9 to P1 is inhibited. That is, arcs 163, 164 and 165 use unidirectional arcs. Similarly, arcs from the root node of the RHS graph to the first occurrence SC arc use unidirectional arcs which inhibit the information flow to the root node (step 127). For example, in the RHS graph shown in FIG. 15, if an SC arc is not present at upper arcs than P1, the information flow upper than P1 is inhibited. That is, arc 166 uses a unidirectional arc.

That there is no SC arc means that the generated data do not influence the execution of other rules at all. Therefore, that the information is inhibited to flow toward that direction means that unnecessary information flow is inhibited.

Figure 16:
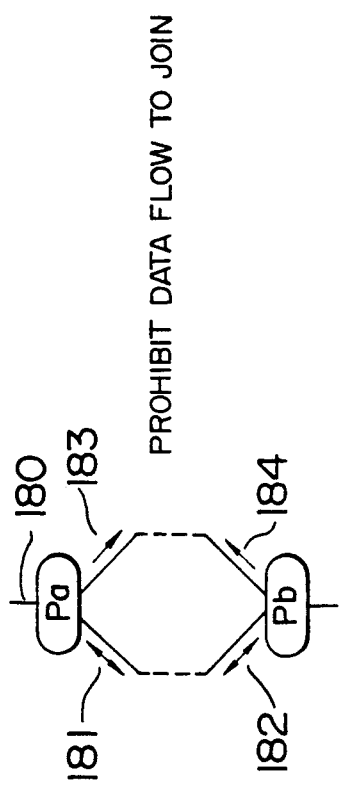
FIG. 16 shows a partial structure of the hierarchical graph.

The hierarchical graph is not of a tree-structure but of a graph-structure so that the structure as shown in FIG. 16 may be realized. If such a structure is realized in the RHS graph and if WME flows from upper than Pa, i.e., from arc 180, the WME is joined at Pb via arcs 182 and 184. Thus, the same WME flows twice and the same process are carried out twice. This is also true for the reverse direction. In order not to join information at Pa and Pb, the flow in the junction direction of arcs is inhibited except for one arc (step 128). In this example, arcs 181 and 182 use bidirectional arcs, whereas arcs 183 and 184 use unidirectional arcs from Pa to Pb.

Figure 17:
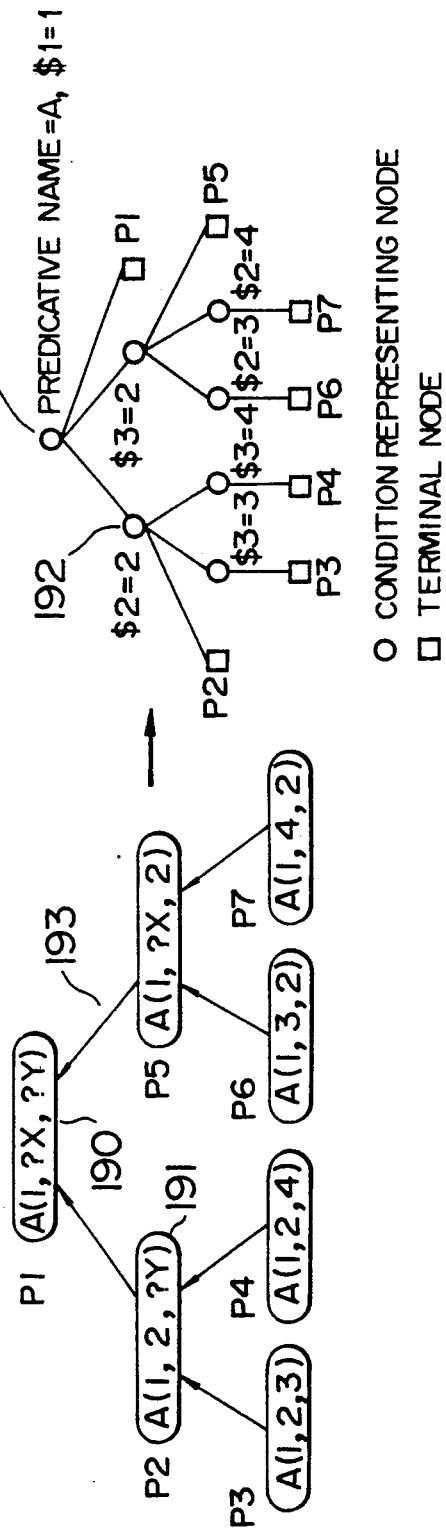
FIG. 17 illustrates the process of transforming the graph into a discrimination network.

Lastly, in the graph shown in FIG. 15, a difference between patterns coupled with an S arc is expressed at a node for the S arc (step 129). For example, in FIG. 17, the difference $=2 between patterns 190 and 191 is expressed at node 192 such that the graph 193 is transformed into a discrimination net as of network 194.

With the above processes, the rule relation graph suitable for fast bidirectional inference can be efficiently generated.

3. Bidirectional Inference Execution Algorithm

Next, the inference processing algorithm according to the present inference method will be described.

First, the outline of the processing will be described with reference to the network shown in FIG. 6.

The description for the network processing method will be given. First, the process for supplying a WME to the LHS net will be described. A WME is supplied to all the output arcs from the forward-root node. At the constant node, the condition stored in the constant node is checked if it is satisfied. If satisfied, the WME is supplied to the output arc thereof. At the variable node, it is checked if the associated slot is present or not, to thereafter input a value to the variable.

At the terminal node, the WME is stored at its input arc. If WMEs have already been stored at all the other input arcs thereof, the set of WMEs is formed and outputted to the output arc thereof. For example, upon application of WME 1 (A $A1 a1 $A2 a2 $A3 a3) to the network under the initialized condition, i.e., under the condition that there is no information stored in the network, WME 1 reaches the input arcs of the terminal nodes 65 and 66 of rules A and B and stored therein. Since the terminal node 65 of rule A has only one input arm, WME 1 is stored at the output arc thereof. The terminal node 66 of rule B has two input arcs. However, the other input arc stores no information so that the output arc thereof does not store WME 1. In this condition, upon further application of WME 2 (B $B1 b1 $B2 b2 $B3 b3) to the network, WME 2 reaches the input arcs of the terminal nodes 66 and 63 of rules B and C and stored therein. Since the other input arc of the terminal node 66 of rule B has already stored WME 1, the set of WME 1 and WME 2 is formed and stored in the output arc thereof.

By the above processes, the output arcs of the terminal nodes 65 and 66 of rules A and B have stored WME 1 and a set of WME 1 and WME 2, respectively, which satisfy the condition parts of WMEs.

Next, among sets or conflict sets of WMEs stored in the output arcs of the terminal nodes, one set of WMEs is selected using the conflict resolution tactics and supplied to the RHS net. In the RHS net, the conditions stored in the constant nodes are collected, values are inputted to the variables in accordance with the conditions stored in the variable nodes. For example, WME 1 of rule A shown in FIG. 5 is supplied to the RHS net, "?X" is replaced with a3 so that at the backward-root node, (C $C1 c1 $C2 c2 $C3 a3) is generated and stored in the working memory. The newly generated WME is supplied not to the forward-root node, but to $C3=?Y (node 62) of the LHS net via SC arc 64 indicated by a broken line. In this example, since an SC arc is present in the midst of processing in the RHS net, the processing in the LHS net becomes necessary. However, there is no SC arc during execution of, e.g., rule D which does not influence the LHS net, so that the generated WME is not necessary to be supplied to the LHS net.

Next, the backward influence will be described. A given goal is supplied to the network at the backward-root node. At the constant node, it is checked if the condition stored therein is satisfied or not. If satisfied, the goal is supplied to the next node. At the variable node, the constraint on a variable is generated. For example, assuming goal 1 (D $D1 d1 $D2 d2 $D3 a3) is used, a constraint "?Y=a3" is generated at the variable node 67 of "$D3=?Y".

Upon reception of the goal at the terminal node, the goal and its constraint condition are stored at the output arc of the terminal node. For example, in the above case, goal 1 reaches the terminal node of rule C so that it is recognized that goal 1 can be traced by using rule C. As above, at the output arc of the terminal node, the goal which is not still satisfied but can be guided using the rule is stored together with its constraint condition. For example, (goal 1, ?Y=a3) is stored at the output arc.

Next, the goals are supplied to the LHS net. For example, in the above case, goal 1 is supplied further to the upper nodes to generate a new goal. This generation is conducted in a similar manner to that of WME generation. At the constant node, the value is stored, and at the variable node, the value in the constraint condition is stored. At the forward-root node, a new goal 2 (C $C1 c1 $C2 c2 $C3 a3) has been generated using the constraint "?Y=a3". This goal is a correct one for rule C, but it includes unnecessary information. According to the present inference method, however, the process is not performed up to the forward-root node, but the processing in the RHS net is performed using an SC arc. In this case, the new goal is goal 2 ($C3 a3) so that the process starts from the node upper than node 68 of "$C2=c2" in the RHS net. Since node of "$C3=c3" is present, goal 2 does not reach the terminal node 66 for rule B. However, goal 2 with its constraint "?X=a3" reaches the terminal node 65 of rule A.

As above sub-goals are sequentially generated while tracing the rule backward. Next, the process where a sub-goal is satisfied will be described.

At the time when the goal reaches the terminal node, if a set of WMEs has been stored in the output arc of the terminal node and satisfies the constraint, then the goal can be guided through execution of a rule using the set of WMEs. For example, if goal 2 reaches the terminal node 65 for rule A, goal 2 is determined matchable because WME 1 has been stored at the output arc thereof and satisfies the constraint "?X=a3".

Then, the above-described forward inference is performed using the set of WMEs. In this case, when the set of WMEs flows through the output arc of the terminal node, the goal matchable with the set of WMEs is deleted, and also the same goals or the sub-goals generated during goal matching are deleted from all the terminal nodes. In the above example, all the goal 2 are deleted, and rule A is executed forward using WME 1. Upon this execution, if a new set of WMEs has been stored at the terminal node and a goal has been stored thereat and the constraint condition is satisfied, then a further forward execution is conducted. For example, upon execution with WME 1, if WME 3 is generated, then WME 2 and WME 3 are stored at the output arc of the terminal node 63 of rule C. Since the WMEs match the constraint of goal 1 stored in the arc, rule C is further executed using WME 2 and WME 3.

The backward inference has been carried out by the above processes. Until such time the obtained result has already been written in the working memory.

The above processes are the fundamental operation of the network, based on which the backward reverse type cooperation inference and backward restart type cooperation inference are realized.

The backward reverse type cooperation inference is conducted, if a WME necessary for the forward inference is not known, for automatic recognition of the unknown WME using the backward inference. This is carried out as in the following. If a WME supplied to the network reaches the terminal node, but WMEs at the other arcs are not present at that time, and the other arcs are bidirectional arcs, then using the arcs the above-described backward inference is performed.

The backward restart type cooperation inference is an inference method which restarts the backward inference when necessary data for backward inference previously failed are collected. This is carried out as in the following. Even if a backward inference results in failure, the goal is maintained stored in the terminal node, and the forward inference is performed with priority of the instantiation capable of deleting the goal.

Next, the detail of the above processes will be described with reference to the accompanying flow charts.

Figure 18:
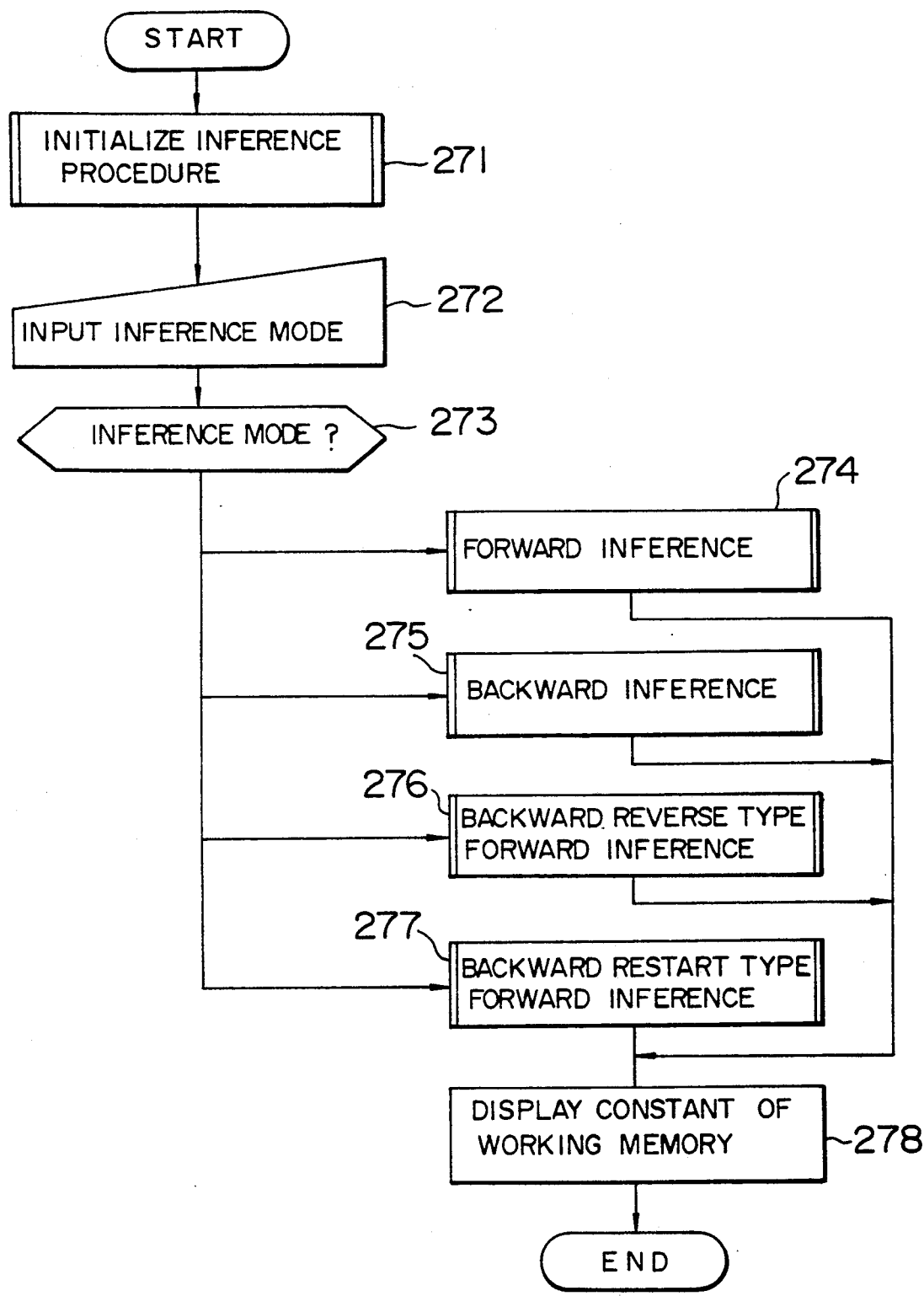
FIG. 18 is a main flow chart for a bidirectional inference execution algorithm.

FIG. 18 shows the main flow chart. First, the inference procedure is initialized (step 271). An inference mode is inputted (step 272). The inputted inference mode is judged (step 273) to perform a forward inference (step 274), backward inference (step 275), backward reverse type inference (step 276) or backward restart type inference (step 277). The content of the working memory at the end of the inference is outputted to a display.

Figure 19:
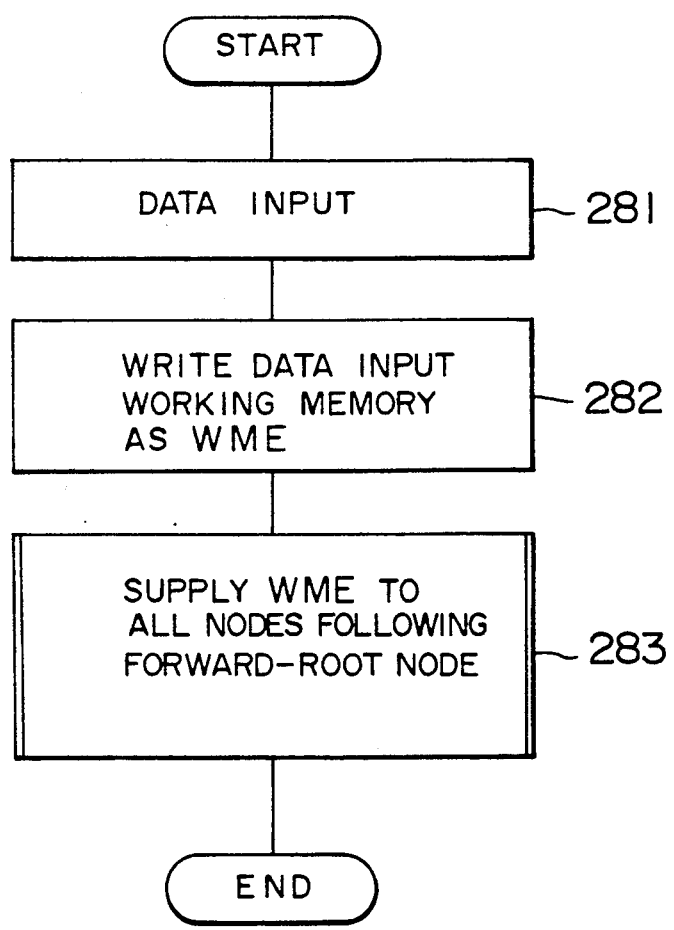
FIGS. 19 to 24 are the details of the flow chart shown in FIG. 18.

The initialization (step 271) of the inference procedure will be described with reference to the flow chart shown in FIG. 19. Data are received (step 281) and written as WMEs in the working memory (step 282). Each WME is supplied to the network from the forward-root node (registration of WME into the network) (step 283).

Figure 20:
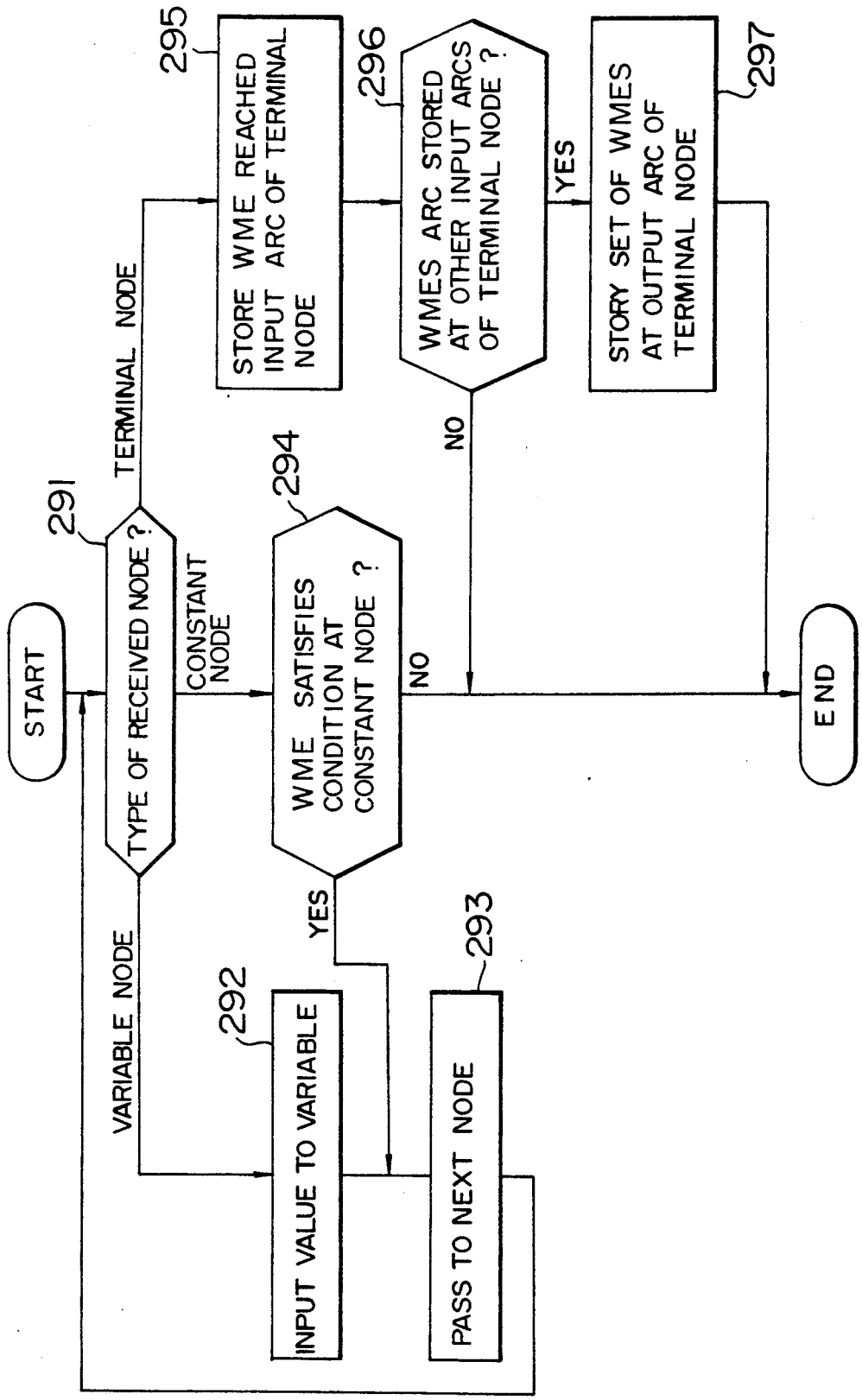

The registration of WME into the network is carried out as shown in the flow chart of FIG. 20. The type of node at which a WME reaches is judged (step 291). In case of a variable node, a value is inputted to the variable (step 291) to follow the next node (step 293). In case of a constant node, it is judged if the condition is satisfied (step 294). If satisfied, the WME is supplied to the next node (293). If not satisfied, the process is terminated.

In case of a terminal node, first the WME is stored at the input arc to the terminal node (step 295). If WMEs have already been stored at the other input arcs of the terminal node (step 296), then a set of WMEs is generated and stored at the output arc of the terminal node (step 297). If WMEs have not been stored as yet at the other input arcs, the process is terminated.

The initialization has been performed by the above processes.

If the status of WME changes, the changed WME is supplied to the network at a desired timing in accordance with the flow chart shown in FIG. 20.

Each inference method will now be described.

Figure 21:
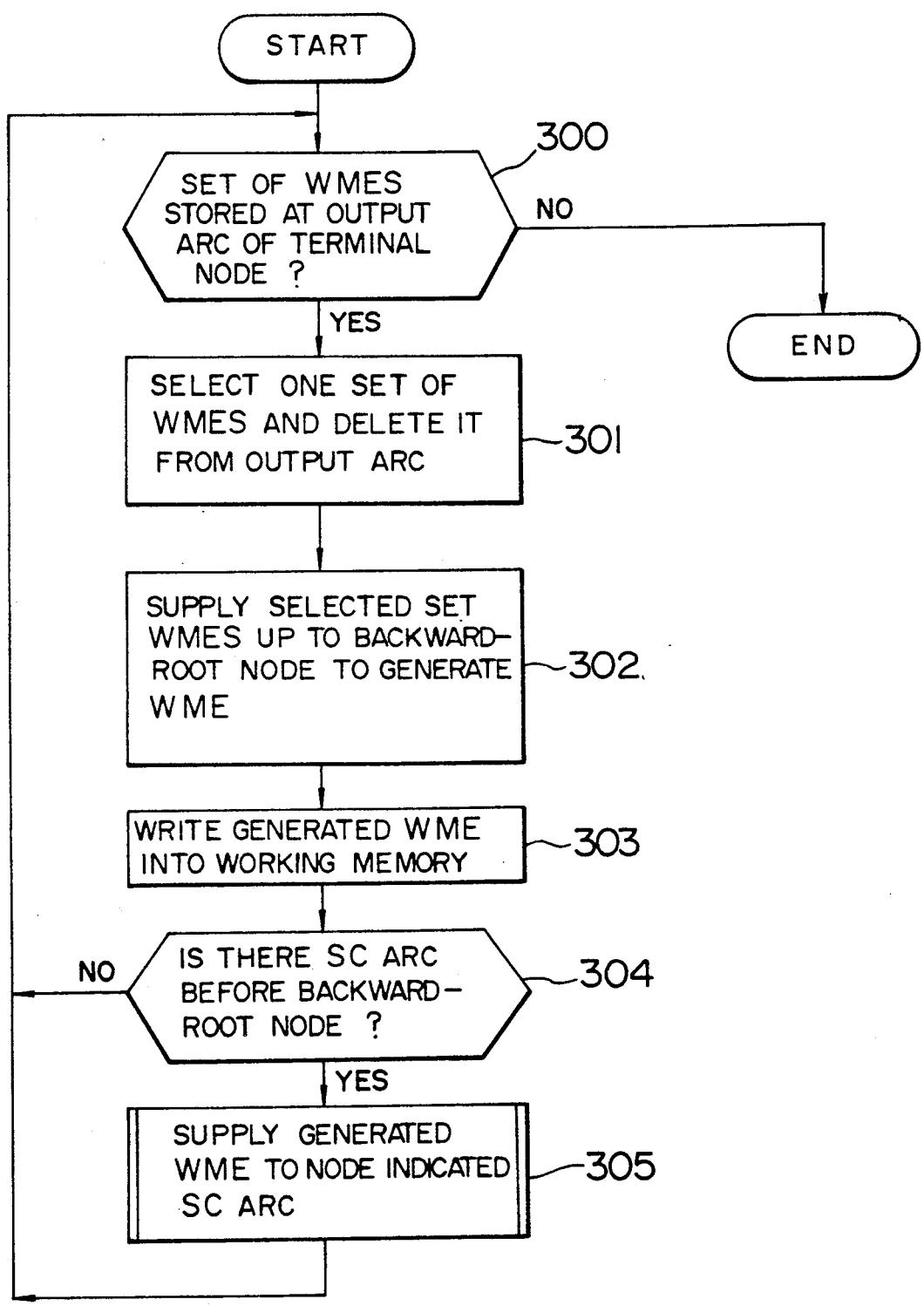

The forward inference is processed in accordance with the flow chart shown in FIG. 21. First, it is checked if a WME has already been stored at the output arc of a terminal node (step 300). If not stored, it means that there is no executable rule so that the process is terminated.

If stored, one set of WMEs is selected and deleted from the output arc (step 301). The selected set of WMEs is supplied up to the backward-root node to generate a WME (step 302). If an SC arc appears in the midst of generating a WME (step 304), the set of WMEs is supplied to the network from the node indicated by the SC arc, in accordance with the flow chart shown in FIG. 20 (step 305). The above processes are repeated up to the last executable rule.

Figure 22:
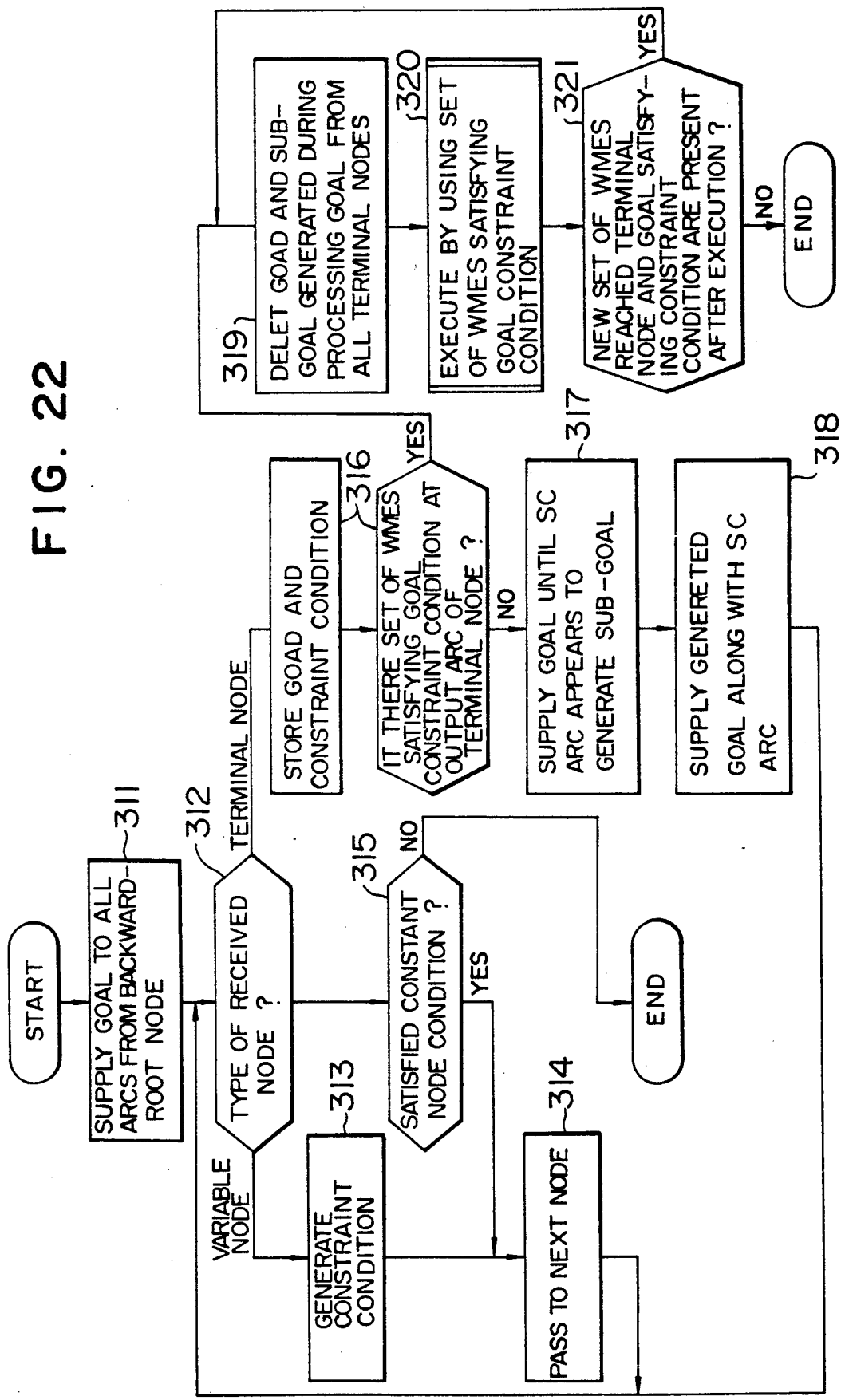

The backward inference is processed in accordance with the flow chart shown in FIG. 22. First, a goal is supplied to the network from the backward-root node (step 311). Next, the type of node the goal reaches is judged (step 312). In case of a variable node, the constraint condition is generated (step 313) to follow the next node (314). In case of a constant node, it is checked if the condition is satisfied (step 315). If satisfied, the goal is supplied to the next node (step 314). If not satisfied, the process is terminated.

In case of a terminal node, the goal and the generated constraint condition are stored at the output arc of the terminal node, and it is checked if there is a set of WMEs satisfying the goal constraint condition at the output arc (step 316). If not, the goal is supplied further until an SC arc appears, and a sub-goal is generated (step 317) to perform the processes from step 312 starting from the node indicated by the SC arc (step 318).

If there is a set of WMEs satisfying the goal constraint condition at the output arc of the terminal node, the goal as well as the sub-goal generated during processing the goal are deleted from all the terminal nodes (step 319), and a rule is executed in accordance with the flow chart shown in FIG. 21 using the set of WMEs satisfying the goal constraint condition (step 320). Upon execution of the rule, if a new set of WMEs have reached the terminal node and a goal satisfied by the new set of WMEs is present at the output arc thereof (step 321), then a rule is executed starting from step 319 using the new set of WMEs, in a similar manner as above. If not, the process is terminated.

Figure 23:
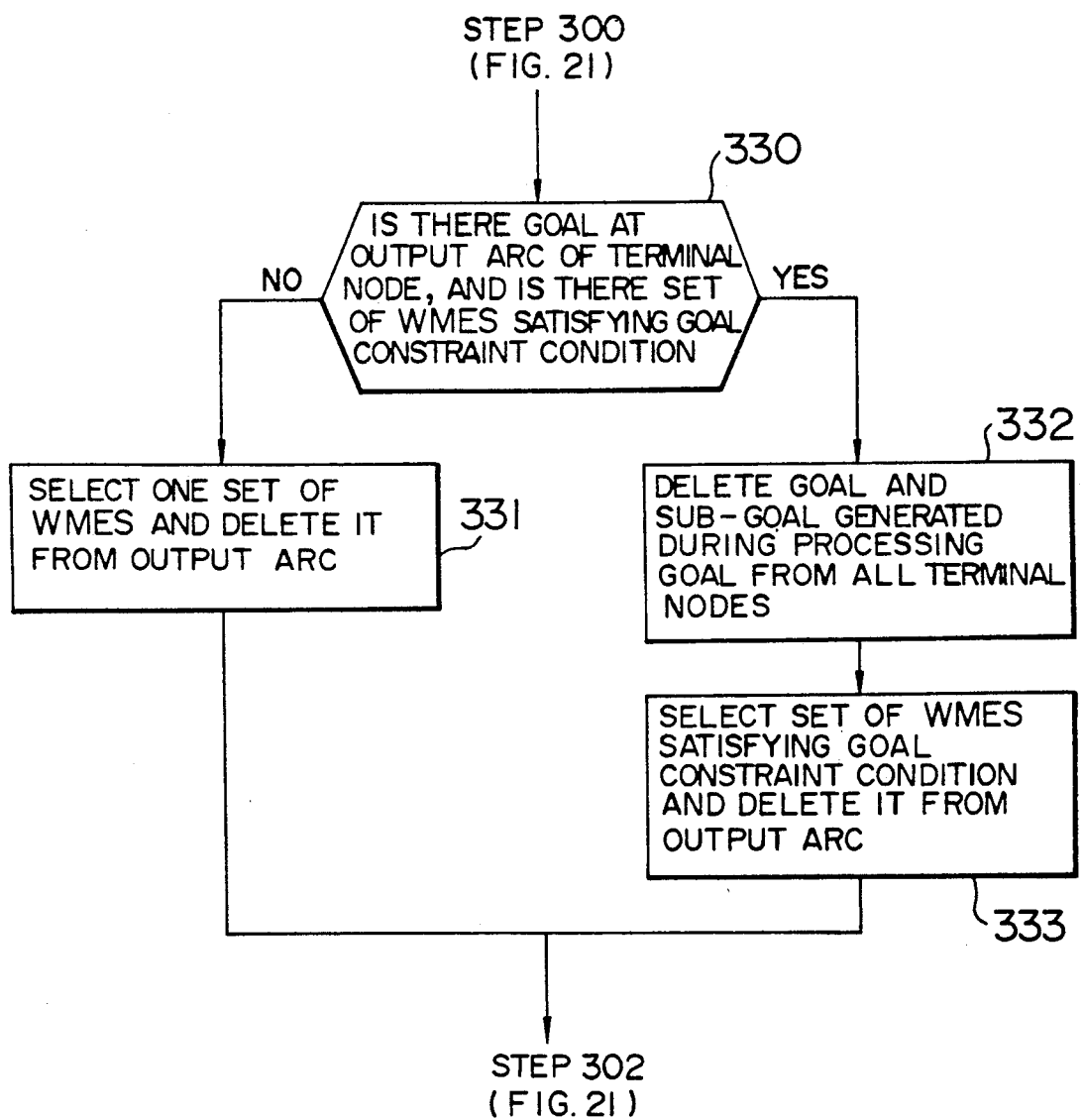

The backward restart type inference is realized by performing the process at step 301 shown in FIG. 21 as the process modified forward inference shown in FIG. 23. First, it is checked if a goal and a set of WMEs satisfying the constraint condition are present at the output terminal of the terminal node (step 330). If present, a rule is executed by using the set of WMEs (steps 332 and 333). If not present, a rule is executed by using an optional set of WMEs (step 331).

After performing the above processes, if the unsatisfied goal becomes a satisfied goal, the above processes are carried out with priority so that the backward inference previously failed restarts.

Figure 24:
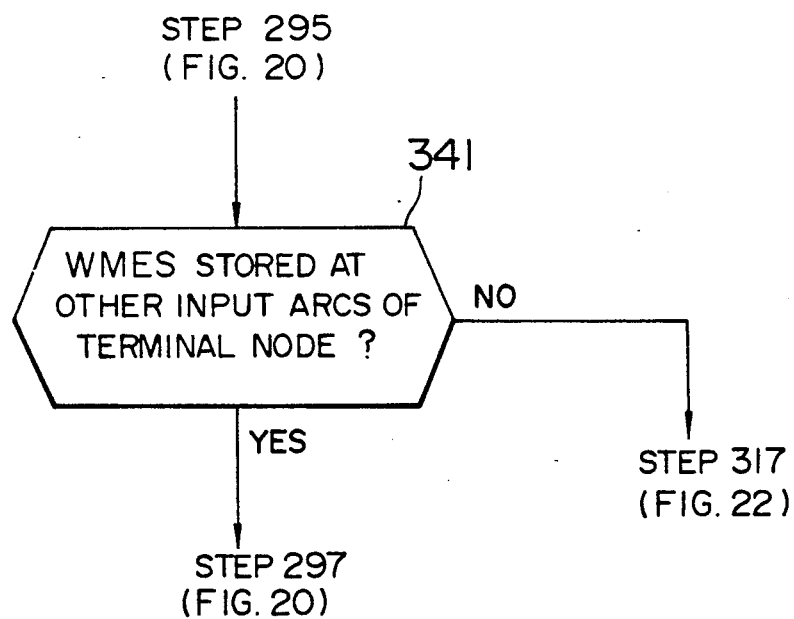

The backward reverse type inference is realized by performing the process at step 296 shown in FIG. 20 as the process modified forward inference shown in FIG. 24. It is checked if a WMEs being stored at the other input arcs of the terminal node (step 341). If stored, the process at step 297 shown in FIG. 20 is performed. If not stored, the backward inference is processed starting from step 317 shown in FIG. 22.

As above, automatic instantiation through the backward inference becomes possible for the case where a rule cannot be executed because the other condition clauses are not satisfied.

According to the present inference method, the forward inference, backward inference, backward restart type and backward reverse type bidirectional inferences can be advantageously realized at high speed. Also, the bidirectional inference using the same rule can be realized.

In the network constructed such that the network representative of the rule condition part is situated above and the network representative of the rule consequence part is situated below, the highest node is the forward-root node and the lowest node is the backward-root node. In such a network, the process flow from the upper forward-root node toward the lower backward-root node represents forward inference, whereas on the other hand the process flow from the lower backward-root node toward the upper forward-root node represents backward inference.

An attribute regarding the direction of information flow on an arc of the network is provided so that unnecessary information flow within the network can be eliminated, to thus speed up inference.

Further, a shortcut arc is provided for direct couple between the consequence and condition part networks to pass a same condition if such a condition appears in the network. The new result obtained through forward inference can be supplied therefore to the network not from the forward-root node, but from the midway of the condition part network by following the shortcut arc, thus speeding up the forward inference. In the case of backward inference, an obtained sub-goal is supplied to the network not from the backward-root node but from the midway of the network by following the shortcut arc, thus speeding up the backward inference.

Furthermore, the status data and a goal flowing within the network are controlled at that a forward inference can be realized with various conflict resolution tactics. With the control of a goal, many types of inferences including a backward inference can be realized with various tactics such as breadth first search, depth first search and the like. Unnecessary network processing can be avoided by storing history information regarding a goal in the network.

Still further, the LHS and RHS networks are generated from the hierarchic graph based on the inclusion relations among patterns so that the conditions of upper patterns can be processed in common to thus provide an efficient network. In addition, a shortcut arc is provided so as to supply data only to the network portion where preliminary analysis of patterns showed matchable. Thus, an efficient rule relation graph suitable for fast bidirectional inference can be generated which is composed of efficient LHS and RHS nets and shortcut arcs.

According to the present inference method utilizing the hierarchical graph, the number of pattern matchings necessary for generation of the hierarchical graph is $O(N*logN)$ since the depth of the hierarchical graph is proportional to $log_m N$, where N is the number of patterns and m is the number of average branches in the hierarchical graph. Whereas the number of pattern matchings in transforming from the IM graph into ST-MET is $O(N)$ so that the total processing amount becomes $O(N*log N)$, thus providing an efficient inference method.

We claim:

1. A method of operating a data processor for performing a fast bidirectional inference in a computer system, the method comprising the steps of:
    (a) transforming, by said data processor, rule condition parts of a set of rules, stored in a memory of said computer system, into a first network comprising: i) condition part nodes representative of condition clauses constituting said rule condition parts, ii) a first arc set representative of relations between ones of said condition clauses, iii) forward-root node as an input node of the first network, and iv) first terminal nodes as output nodes of the first network;
    (b) transforming, by said data processor, rule consequence parts of the set of rules into a second network comprising: i) second nodes representative of -statements constituting said consequence parts of the set of rules, ii) a second arc set representative of relations between ones of said statements, iii) a backward-root node as an input node of the second network, and iv) second terminal nodes as output nodes of the second network;
    (c) forming, by said data processor, a third network by coupling said first and second networks at said first and second terminal nodes;
    (d) forming, by said data processor, a partial bidirectional network by adding to said third network a bidirectional arc on which data flows bidirectionally and a unidirectional arc on which the data flows only unidirectionally;
    (e) performing, by said data processor, the forward inference of said bidirectional inference by applying current data stored in a working memory of said computer system, representative of a status of an object, to said third network from the forward-root node of said first network toward the backward-root node of said second network, and determining if ones of the condition clauses represented by each of said condition part nodes are satisfied; and,
    (f) performing, by said data processor, the backward inference of said bidirectional inference by applying said current data further to said second network to infer new current data for rules having said satisfied condition clauses.

2. A method of operating a data processor for performing a fast bidirectional inference in a computer system, the method comprising the steps of:
    (a) transforming, by said data processor, rule condition parts of a set of rules, stored in a memory of said computer system, into a fist network comprising: i) condition part nodes representative of condition clauses constituting said rule condition parts, ii) a first arc set representative of relations between ones of said condition clauses, iii) a forward-root node as an input node of the first network, and iv) first terminal nodes as output nodes of the first network;
    (b) transforming, by said data processor, rule consequence parts of the set of rules into a second network comprising: i) second nodes representative of statements constituting said consequence parts of the set of rules, ii) a second arc set representative of relations between ones of said statements, iii) a backward-root node as an input node of the second network, and iv) second terminal nodes as output nodes of the second network;

(c) forming, by said data processor, a third network by coupling said first and second networks at said first and second terminal nodes;

(d) performing, by said data processor, the forward inference of said bidirectional inference by applying current data stored in a working memory of said computer system, representative of a status of an object, to said third network from the forward-root node of said first network toward the backward-root node of said second network, and determining if ones of the condition clauses represented by each of said condition part nodes are satisfied;

(e) performing, by said data processor, the backward inference of said bidirectional inference by applying said current data further to said second network to obtain new inferred current data for rules having said satisfied condition clauses;

(f) applying, by said data processor, a goal to be instantiated to said third network from the backward-root node of said second network toward the forward-root node of said first network, identifying a rule by which said goal is guided, applying said goal to said first network coupled to said second network, and obtaining a new sub-goal; and, (g) setting, by said data processor, an arc coupling said first and second networks and passing over portions of said third network where any common statement/condition clauses are found in said first and second networks, thereby permitting the current data and said goal to be instantiated to flow via said arc.

3. A method of operating a data processor for performing a fast bidirectional inference in a computer system, the method comprising the steps of:

(a) transforming, by said data processor, rule condition parts of a set of rules, stored in a memory of said computer system, into a first network comprising: i) condition part nodes representative of condition clauses constituting said rule condition parts, ii) a first arc set representative of relations between ones of said condition clauses, iii) a forward-root node as an input node of the fist network, and iv) first terminal nodes as output nodes of the first network;

(b) transforming, by said data processor, rule consequence parts of the set of rules into a second network comprising: i) second nodes representative of statements constituting said consequence parts of the set of rules, ii) a second arc set representative of relations between ones of said statements, iii) a backward-root node as an input node of the second network, and iv) second terminal nodes as output nodes of the second network;

(c) forming, by said data processor, a third network by coupling said first and second networks at said first and second terminal nodes;

(d) performing, by said data processor, the forward inference of said bidirectional inference by applying current data stored in a working memory of said computer system, representative of a status of an object, to said third network from the forward-root node of said first network toward the backward-root node of said second network, and determining if ones of the condition clauses represented by each of said condition part nodes are satisfied;

(e) performing, by said data processor, the backward inference of said bidirectional inference by applying said current data further to said second network to obtain new inferred current data for rules having said satisfied condition clauses;

(f) applying, by said data processor, a goal to be instantiated to said third network from the backward-root node of said second network toward the forward-root node of said first network, identifying a rule by which said goal is guided, applying said goal to said first network coupled to said second network, and obtaining a new sub-goal; and, (g) setting, by said data processor, an arc coupling said firs and second networks and passing over portions of said third network where common statements/condition clauses are represented, thereby permitting the current data and said goal to be instantiated to flow via said arc.

4. A method of operating a data processor for performing a fast bidirectional inference in a computer system, the method comprising the steps of:

(a) transforming, by said data processor, rule condition parts of a set of rules, stored in a memory of said computer system, into a first network comprising: i) condition part nodes representative of condition clauses constituting said rule condition parts, ii) a first arc set representative of relations between ones of said condition clauses, iii) a forward-root node as an input node of the first network, and iv) first terminal odes as output nodes of the first network;

(b) transforming, by said data processor, rule consequence parts of the set of rules into a second network comprising: i) second nodes representative of statements constituting said consequence parts of the set of rules, ii) a second arc set representative of relations between ones of said statements, iii) a backward-root node as an input node of the second network, and iv) second terminal nodes as output nodes of the second network;

(c) forming, by said data processor, a third network by coupling said first and second networks at said first and second terminal nodes;

(d) performing, by said data processor, the forward inference of said bidirectional inference by applying current data stored in a working memory of said computer system, representative of a status of an object, to said third network from the forward-root node of said first network toward the backward-root node of said second network, and determining if ones of the condition clauses represented by each of said condition part nodes are satisfied;

(e) performing, by said data processor, the backward inference of said bidirectional inference by applying said current data further to said second network to infer new current data for rules having said satisfied condition clauses;

(f) applying, by said data processor, a goal to be instantiated to said third network from the backward-root node of said second network toward the forward-root node of said first network, identifying a rule by which said goal is guided, applying said goal to said first network coupled to said second network, and obtaining a new sub-goal;

(g) storing the current data and said goal to be instantiated at an arc in said third network, realizing a forward inference through the flow of said data representative of the status of said object, and realizing a backward inference by controlling the flow of said goal, the current data and said goal to be instantiated being supplied at the same time to said third network to realize both forward and backward inferences in cooperative association.

5. A method of operating a data processor for performing a fast bidirectional inference in a computer system, the method comprising the steps of:

(a) transforming, by said data processor, rule condition parts of a set of rules, stored in a memory of said computer system, into a first network comprising: i) computer part nodes representative of condition clauses constituting said rule condition parts, ii) a first arc set representative of relations between ones of said condition clauses, iii) a forward-root node as an input node of the first network, and iv) first terminal nodes as output nodes of the first network;

(b) transforming, by said data processor, rule consequence parts of the set of rules into a second network comprising: i) second nodes representative of statements constituting said consequence parts of the set of rules, ii) a second arc set representative of relations between ones of said statements, iii) a backward-root node as an input node of the second network, and iv) second terminal nodes as output nodes of the second network;

(c) forming, by said data processor, a third network by coupling said first and second networks at said first and second terminal nodes;

(d) performing, by said data processor, the forward inference of said bidirectional inference by applying current data stored in a working memory of said computer system, representative of a status of an object, to said third network from the forward-root node of said first network toward the backward-root node of said second network, an determining if ones of the condition clauses represented by each of said condition part nodes are satisfied;

(e) performing, by said data processor, the backward inference of said bidirectional inference by applying said current data further to said second network to infer new current data for rules having said satisfied condition clauses;

(f) applying, by said data processor, a goal to be instantiated to said third network from the backward-root node of said second network toward the forward-root node of said first network, identifying a rule by which said goal is guided, applying said goal to said first network coupled to said second network, and obtaining a new sub-goal;

(g) storing the current data and said goal at an arc in said third network to control a flow of said data and realizing a forward inference through first a backward inference by the controlled flow of said goal, the current data and said goal to be instantiated being supplied at the same time to said third network to realize both forward and backward inferences in cooperative association.

6. A method of operating a data processor for performing a fast bidirectional inference in a computer system, the method comprising the steps of:

(a) transforming, by said data processor, rule condition parts of a set of rules, stored in a memory of said computer system, into a first network comprising: i) condition part nodes representative of condition clauses constituting said rule condition parts, ii) a first arc set representative of relations between ones of said condition clauses, iii) a forward-root node as an input node of the first network, and iv) first terminal nodes as output nodes of the first network;

(b) transforming, by said data processor, rule consequence parts of the set of rules into a second network comprising: i) second nodes representative of statements constituting said consequence parts of the set of rules, ii) a second arc set representative of relations between ones of said statements, iii) a backward-root node as an input node of the second network, and iv) second terminal nodes as output nodes of the second network;

(c) forming, by said data processor, a third network by expressing relations among patterns described by said rule condition and consequence parts by a graph using as its structural element two types of patterns including condition and consequence part patterns and generating said third network using said graph coupling said first and second networks at said first and second terminal nodes;

(d) performing, by said data processor, the forward inference of said bidirectional inference by applying current data stored in a working memory of said computer system, representative of a status of an object, to said third network from the forward-root node of said first network toward the backward-root node of said second network, and determining if ones of the condition clauses represented by each of said condition part nodes are satisfied;

(e) performing, by said data processor, the backward inference of said bidirectional inference by applying said current data further to said second network to obtain new inferred current data for rules having said satisfied condition clauses.

7. The method according to claim 6, wherein the expressing step comprises implementing a hierarchical graph which uses as its structural element said two types of patterns including condition and consequence part patterns, and which uses an arc representative of an inclusion relation between said two pattern types as first data which satisfies a first of said two patterns is included in second data which satisfies the other of said two patterns.

8. The method according to claim 7, wherein said step of transforming into a first network comprises: deriving only patterns constituting said rule condition parts out of a hierarchical graph which uses said two types of patterns including condition and consequence part patterns and an arc representative of the inclusion; expressing a difference of conditions between patterns coupled by said arc as a node for said arc; and, setting a terminal node representative of a satisfied pattern.

9. The method according to claim 7, wherein said step of transforming into a second network comprises: deriving only patterns constituting said rule consequence parts; expressing a difference of conditions between patterns coupled by said arc as a node for said arc; and, setting a terminal node representative of a satisfied pattern.

10. The method according to claim 6, wherein the expressing step comprises using a hierarchical graph which uses as its structural element said two types of patterns including condition and consequence part patterns, and which uses a first arc representative of an inclusion relation between said two pattern types as first data which satisfies a first of said two patterns is included in second data which satisfies the other of said two patterns, and a matchable arc between patterns having marching portions in accordance with said inclusion relation.

11. The method according to claim 10, further comprising setting a shortcut arc i) where arcs from the upper pattern portions to patterns coupled by a matchable arc are present within said first network, and ii) where an arc to a terminal pattern representative of a satisfied pattern and an arc to node for determining if a pattern lower than said satisfied pattern is satisfied are present respectively within said second network.

12. The method according to claim 11, further comprising inhibiting arcs from the forward-root node of said first network to a first occurrence shortcut arc to thereby make said current data flow toward said forward-root node.

13. The method according to claim 11, further comprising inhibiting arcs from the backward-root node of said second network to a first occurrence shortcut arc to thereby make said current data flow toward said backward-root node.

14. The method according to claim 11, further comprising joining together a plurality of arcs each as a junction and selectively inhibiting all but for one arc to thereby make said current data flow toward a one of said each junction.

15. The method according to claim 6, further comprising: deriving, out of said graph, a pattern constituting a one of said rule condition parts and an arc representative of an inclusion relation between said two pattern types as first data which satisfies a first of said two patterns included in second data which satisfies the other of said two patterns; expressing a difference of conditions between patterns of the pattern set coupled by said arc as a node for said arc; and, setting a terminal node representative of a satisfied pattern to thereby generate said first network.

16. The method according to claim 6, further comprising: deriving, out of said graph, a pattern constituting a one of said rule consequence parts and an arc representative of an inclusion relation between said two pattern types as first data which satisfies a first of said two patterns is included in second data which satisfies the other of said two patterns; expressing a difference of conditions between patterns of the pattern set coupled by said arc as a node for said arc; and, setting a terminal node representative of a satisfied pattern to thereby generate said second network.

17. A method of operating a data processor for generating a rule relation graph for a bidirectional inference in a computer system, the method comprising the steps of:

(a) generating, by said data processor, a graph representative of a hierarchic relation between patterns, based on a presence of an inclusion relation between the patterns described by a rule condition part and a rule consequence part the inclusion relation being present when first data which satisfies a first pattern is included in second data which satisfies a second pattern;

(b) detecting, by said data processor, ones of said patterns having matching upper pattern portions in accordance with said inclusion relation in said graph, and setting an arc between said detected ones of said patterns;

(c) selecting, by said data processor, a first pattern pair from said condition part and an arc representative of an inclusion relation between said pattern pair, and using a difference between the first pattern pair coupled by said arc as a node for said arc, to thereby generate a condition part network;

(d) selecting, by said data processor, a second pattern pair from said consequence part and an arc representative of an inclusion relation between said pattern pair, and using a difference between the second pattern pair coupled by said arc as a node for said arc, to thereby generate a consequence part network;

(e) detecting, by said data processor, whether a pattern having a first arc to a terminal node of said condition and consequence part networks and a second arc to a node of a pattern lower than said detected pattern is present within both said condition and consequence part networks;

(f) setting, by said data processor, an arc coupling said first and second arc if said pattern is detected;

(g) detecting, by said data processor, that third arcs to patterns coupled by a matchable arc are present within both said condition and consequence part networks, and setting an arc coupling said third arcs; and, (h) performing, by said data processor, the bidirectional inference by applying current data to both said condition and consequence part networks to infer new current data for rules having said satisfied condition clauses.

* * * * *

UNITED STATES PATENT AND TRADEMARK OFFICE
CERTIFICATE OF CORRECTION

PATENT NO. : 5,179,632

DATED : January 12, 1993

INVENTOR(S) : Shunichi Tano, et al.

It is certified that error appears in the above-identified patent and that said Letters Patent is hereby corrected as shown below:

Title Page:

[75] Inventors: Shunichi Tano, et al.
Machida, Japan

Claim 2, column 18, line 54, delete "fist" and substitute therefor --first--.

Claim 3, column 20, line 14, delete "firs" and substitute therefor --first--.

Claim 4, column 20, line 30, delete "odes" and substitute therefor --nodes--.

Claim 5, column 21, line 12, delete "computer" and substitute therefor --condition--.

Claim 5, column 21, line 37, delete "an" and substitute therefor --and--.

Claim 10, column 23, line 2, delete "marching" and substitute therefor --matching--.

UNITED STATES PATENT AND TRADEMARK OFFICE
CERTIFICATE OF CORRECTION

PATENT NO. : 5,179,632
DATED : January 12, 1993
INVENTOR(S) : Shunichi Tano, et al It is certified that error appears in the above-indentified patent and that said Letters Patent is hereby corrected as shown below:

Claim 15, Column 23, line 32, after "patterns" and before "included" insert --is--.

Signed and Sealed this

Second Day of November, 1993

Attest:

BRUCE LEHMAN

*Attesting Officer*     *Commissioner of Patents and Trademarks*